US011952746B1

(12) United States Patent
Kotlaba et al.

(10) Patent No.: US 11,952,746 B1
(45) Date of Patent: Apr. 9, 2024

(54) AUTONOMOUS CONTROL OF ON-SITE MOVEMENT OF POWERED EARTH-MOVING CONSTRUCTION OR MINING VEHICLES

(71) Applicant: AIM Intelligent Machines, Inc., Monroe, WA (US)

(72) Inventors: Robert Kotlaba, Most (CZ); Adam Sadilek, Monroe, WA (US)

(73) Assignee: AIM Intelligent Machines, Inc., Monroe, WA (US)

( * ) Notice: Subject to any disclaimer, the term of this patent is extended or adjusted under 35 U.S.C. 154(b) by 0 days.

(21) Appl. No.: 17/970,427

(22) Filed: Oct. 20, 2022

Related U.S. Application Data

(60) Provisional application No. 63/318,774, filed on Mar. 10, 2022.

(51) Int. Cl.
*E02F 9/20* (2006.01)
*E02F 9/26* (2006.01)
(Continued)

(52) U.S. Cl.
CPC ............ *E02F 9/2045* (2013.01); *E02F 9/205* (2013.01); *E02F 9/261* (2013.01); *E02F 9/264* (2013.01);
(Continued)

(58) Field of Classification Search
CPC ......... E02F 9/2045; E02F 9/205; E02F 9/261; E02F 9/264; G05D 1/0214; G05D 1/024;
(Continued)

(56) References Cited

U.S. PATENT DOCUMENTS 9,630,321 B2 * 4/2017 Bradski .................. G06V 20/10
10,424,204 B1 * 9/2019 Han ......................... G01S 7/415
(Continued)

FOREIGN PATENT DOCUMENTS

CN 111942200 A * 11/2020 .............. B60L 53/00

OTHER PUBLICATIONS

English Translation of CN 111942200 A (Year: 2023).*
(Continued)

*Primary Examiner* — Jess Whittington
*Assistant Examiner* — Shahira Baajour
(74) *Attorney, Agent, or Firm* — VLP Law Group LLP; James A. D. White

(57) ABSTRACT

Systems and techniques are described for implementing autonomous control of powered earth-moving vehicles, including to automatically determine and control movement around a site having potential obstacles. For example, the systems/techniques may determine and implement autonomous operations of powered earth-moving vehicle(s) (e.g., obtain/integrate data from sensors of multiple types on a powered earth-moving vehicle, and use it to determine and control movement of the powered earth-moving vehicle around a site), including in some situations to implement coordinated actions of multiple powered earth-moving vehicles and/or of a powered earth-moving vehicle with one or more other types of construction vehicles. The described techniques may further include determining current location and positioning of the powered earth-moving vehicle on the site, determining a target destination location and/or path of the powered earth-moving vehicle, identifying and classifying obstacles (if any) along a desired path or otherwise between current and destination locations, and implementing actions to address any such obstacles.

18 Claims, 23 Drawing Sheets

(51) Int. Cl.
  G05D 1/00 (2006.01)
  G05D 1/02 (2020.01)
(52) U.S. Cl.
  CPC ............ G05D 1/0214 (2013.01); G05D 1/024 (2013.01); G05D 1/0242 (2013.01); G05D 1/0246 (2013.01); G05D 1/0274 (2013.01); G05D 1/0278 (2013.01); *G05D 2201/0202* (2013.01)
(58) Field of Classification Search
  CPC .. G05D 1/0242; G05D 1/0246; G05D 1/0274; G05D 1/0278; G05D 2201/0202
  See application file for complete search history.

(56) References Cited

U.S. PATENT DOCUMENTS

| | | | |
|---|---|---|---|
| 11,375,041 | B2 | 6/2022 | Theverapperuma et al. |
| 11,494,930 | B2 | 11/2022 | Theverapperuma et al. |
| 11,560,690 | B2 | 1/2023 | Halder et al. |
| 11,567,197 | B2 | 1/2023 | Halder |
| 2020/0111169 | A1 | 4/2020 | Halder et al. |
| 2020/0150687 | A1 | 5/2020 | Halder et al. |
| 2020/0310442 | A1 | 10/2020 | Halder et al. |
| 2020/0326713 | A1 | 10/2020 | Spielman et al. |
| 2021/0080965 | A1 | 3/2021 | Starr et al. |
| 2021/0191409 | A1* | 6/2021 | Ready-Campbell ... G01C 21/20 |
| 2022/0024485 | A1 | 1/2022 | Theverapperuma et al. |
| 2022/0026921 | A1 | 1/2022 | Halder |
| 2022/0340171 | A1 | 10/2022 | Halder |
| 2023/0134855 | A1* | 5/2023 | Hodel .................. E02F 9/2041 701/50 |

OTHER PUBLICATIONS

Grove—12 Bit Magnetic Rotary Position Sensor (AS5600), retrieved on Aug. 22, 2022 from wiki.seeedstudio.com/Grove-12-bit-Magnetic-Rotary-Position-Sensor-AS5600/, 13 pages.
ZED-F9P-04B u-blox F9 high precision GNSS module, May 3, 2022, retrieved on Aug. 22, 2022 from www.u-blox.com/sites/default/files/ZED-F9P-04B_DataSheet_UBX-21044850.pdf, 25 pages.
Digi XBee SX 868 Datasheet, retrieved on Aug. 22, 2022 from www.digi.com/resources/library/data-sheets/ds_xbee-sx-868, 2 pages.
ST LM217/LM317 Datasheet, Dec. 2021, retrieved on Aug. 22, 2022 from www.st.com/resource/en/datasheet/lm317.pdf, 34 pages.
ST LD1117 Datasheet, Feb. 2020, retrieved on Aug. 22, 2022 from www.st.com/resource/en/datasheet/ld1117.pdf, 46 pages.
Texas Instruments TCAN33x 3.3-V CAN Transceivers With CAN FD, Dec. 2019, retrieved on Aug. 22, 2022 from www.ti.com/lit/gpn/TCAN334, 45 pages.
PJRC Teensy 4.1 Development Board, retrieved on Mar. 18, 2022 from www.pjrc.com/store/teensy41.html, 22 pages.
Fairchild Semiconductor ONSEMI N-Channel Logic Level Enhancement Mode Field Effect Transistor BSS138, Nov. 2021, retrieved on Aug. 22, 2022 from www.onsemi.com/pdf/datasheet/bss138-d.pdf, 7 pages.
NXP Semiconductors i.MX RT1060 Crossover MCU with Arm® Cortex®-M7 Core, retrieved on Aug. 22, 2022 from https://www.nxp.com/products/processors-and-microcontrollers/arm-microcontrollers/i-mx-rt-crossover-mcus/i-mx-rt1060-crossover-mcu-with-arm-cortex-m7-core:i.MX-RT1060, 9 pages.
Livox LVX Specifications v1.1.0.0, 2019, retrieved on Aug. 22, 2022 from www.livoxtech.com/3296f540ecf5458a8829e01cf429798e/downloads/Livox Viewer/LVX Specifications EN_20190924.pdf, 12 pages.
Inductive Proximity Sensor LJ12A3-4-Z/BX, retrieved on Aug. 22, 2022 from datasheetspdf.com/pdf-file/1096182/ETT/LJ12A3-4-Z/1, 1 page.
Brianna Wessling, "Teleo announces $12M in Series A funding", Jun. 13, 2022, retrieved on Jun. 20, 2022 from www.therobotreport.com/teleo-announces-12m-in-series-a-funding/, 10 pages.
Frank Tobe, "Blue River Technology sells to Deere for $305 million", Sep. 7, 2017, retrieved on Jun. 20, 2022 from www.therobotreport.com/startup-blue-river-technology-sells-deere-305-million/, 12 pages.
Steve Crowe, "John Deere Acquires Light's Camera-Based Perception Platform", May 19, 2022, retrieved on Jun. 20, 2022 from www.therobotreport.com/john-deere-acquires-light-camera-based-perception-platform/, 12 pages.
TRL Off-Highway Automated Vehicles Code Of Practice, 2021, retrieved on Aug. 22, 2022 from trl.co.uk/uploads/trl/documents/PPR994-Off-Highway-AV-CoP_v3.pdf, 40 pages.
Steve Crowe, "John Deere Acquiring Bear Flag Robotics For $250M", Aug. 5, 2021, retrieved on Jun. 20, 2022 from www.therobotreport.com/john-deere-acquiring-bear-flag-robotics-250m/, 11 pages.
Steve Crowe, "Oxbotica Pilots Safety Framework For Off-Road Autonomous Driving", Jun. 7, 2021, retrieved on Jun. 20, 2022 from www.therobotreport.com/oxbotica-pilots-safety-framework-off-road-autonomous-driving/, 11 pages.
Brianna Wessling, "MIT Researchers Help Robots Navigate Uncertain Environments", May 24, 2022, retrieved on Jun. 20, 2022 from www.therobotreport.com/mit-researchers-help-robots-navigate-uncertain-environments/, 10 pages.
Carnegie Mellon University National Robotics Engineering Center—Off-Road Autonomy, retrieved on Aug. 22, 2022 from https://www.nrec.ri.cmu.edu/solutions/defense/other-projects/off-road-autonomy.html, 5 pages.
Greg Nichols, "Off Road: Autonomous Driving's New Frontier Requires A New Kind Of Sensor", Apr. 14, 2021, retrieved on Jun. 20, 2022 from www.zdnet.com/article/off-road-autonomous-drivings-new-frontier-requires-a-new-kind-of-sensor/, 15 pages.
Tagolas Magma X2 Datasheet, retrieved on Aug. 22, 2022 from www.taoglas.com/datasheets/AA.175.301111.pdf, 20 pages.
LIVOX Mid-40/Mid-100 LiDAR Specs, retrieved on Aug. 22, 2022 from https://www.livoxtech.com/mid-40-and-mid-100/specs, 2 pages.
Masami Hirayama, "Path Planning For Autonomous Bulldozers", Jul. 2019, accessed Sep. 18, 2023 from https://unsworks.unsw.edu.au/entities/publication/bd7e0eee-353d-4b01-8c5e-eb965947e70a, 182 pages.
Zhang et al., "An Autonomous Excavator System For Material Loading Tasks", Jun. 30, 2021, Science Robotics 6 eabc3164 (2021), 12 pages.

* cited by examiner

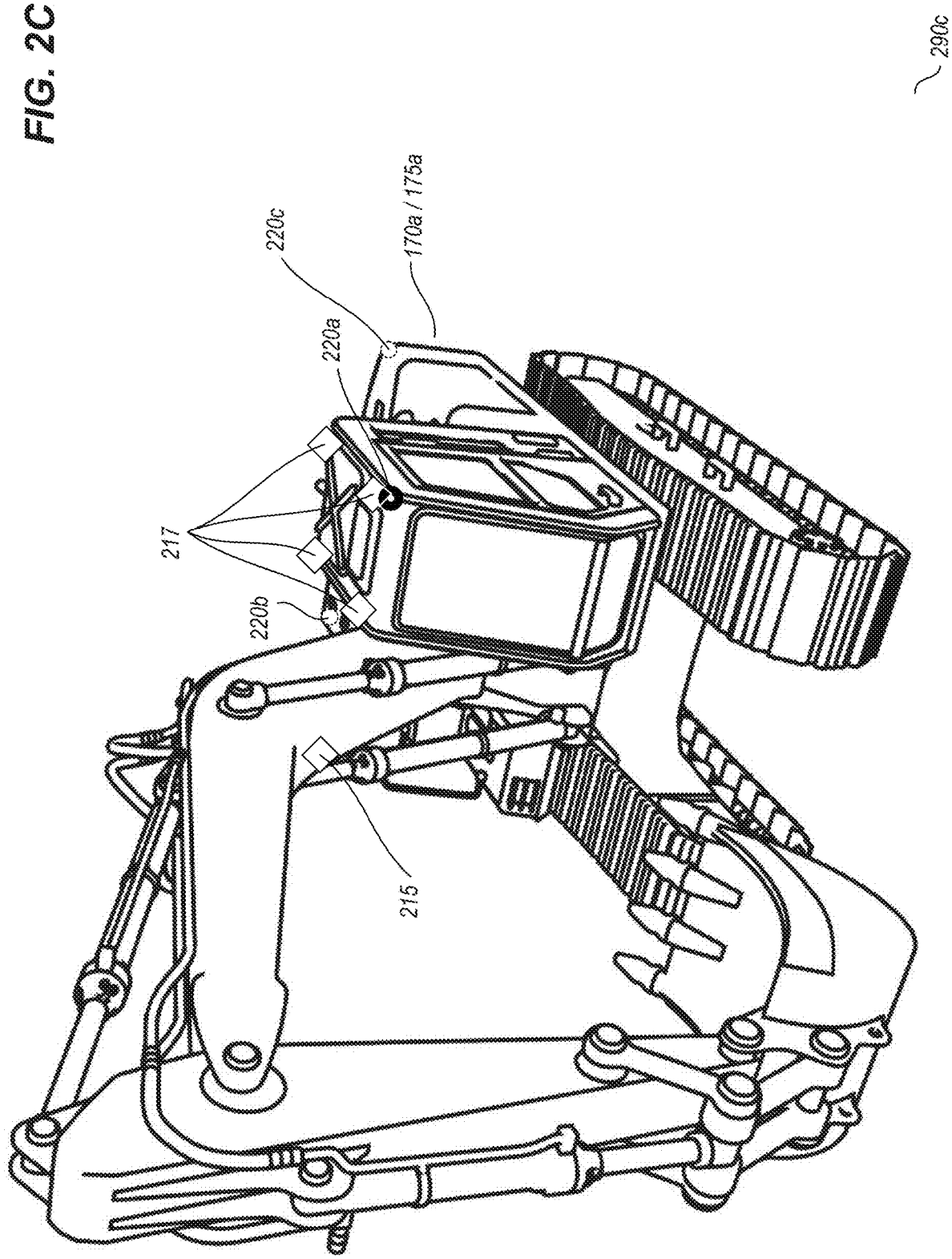

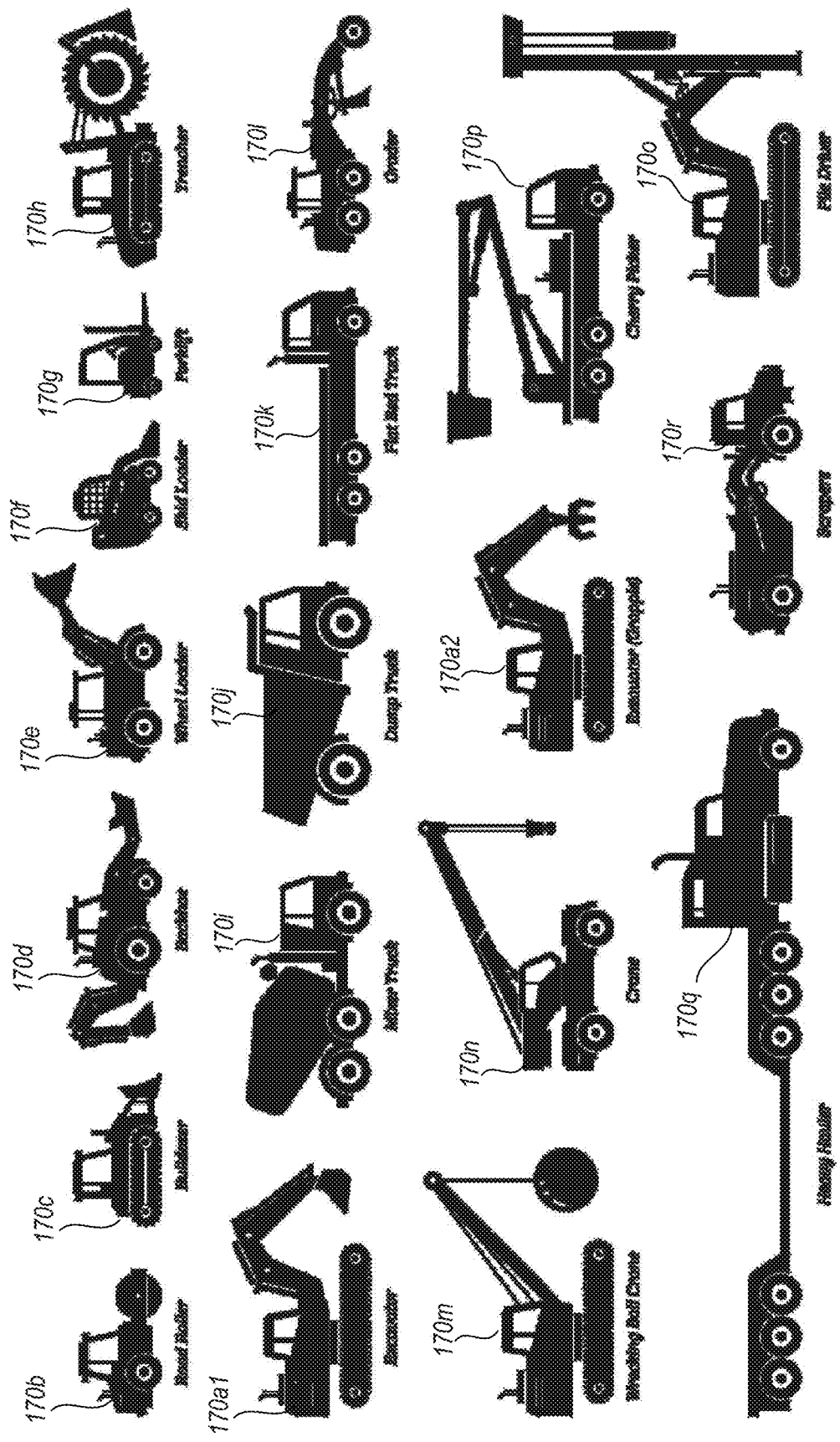

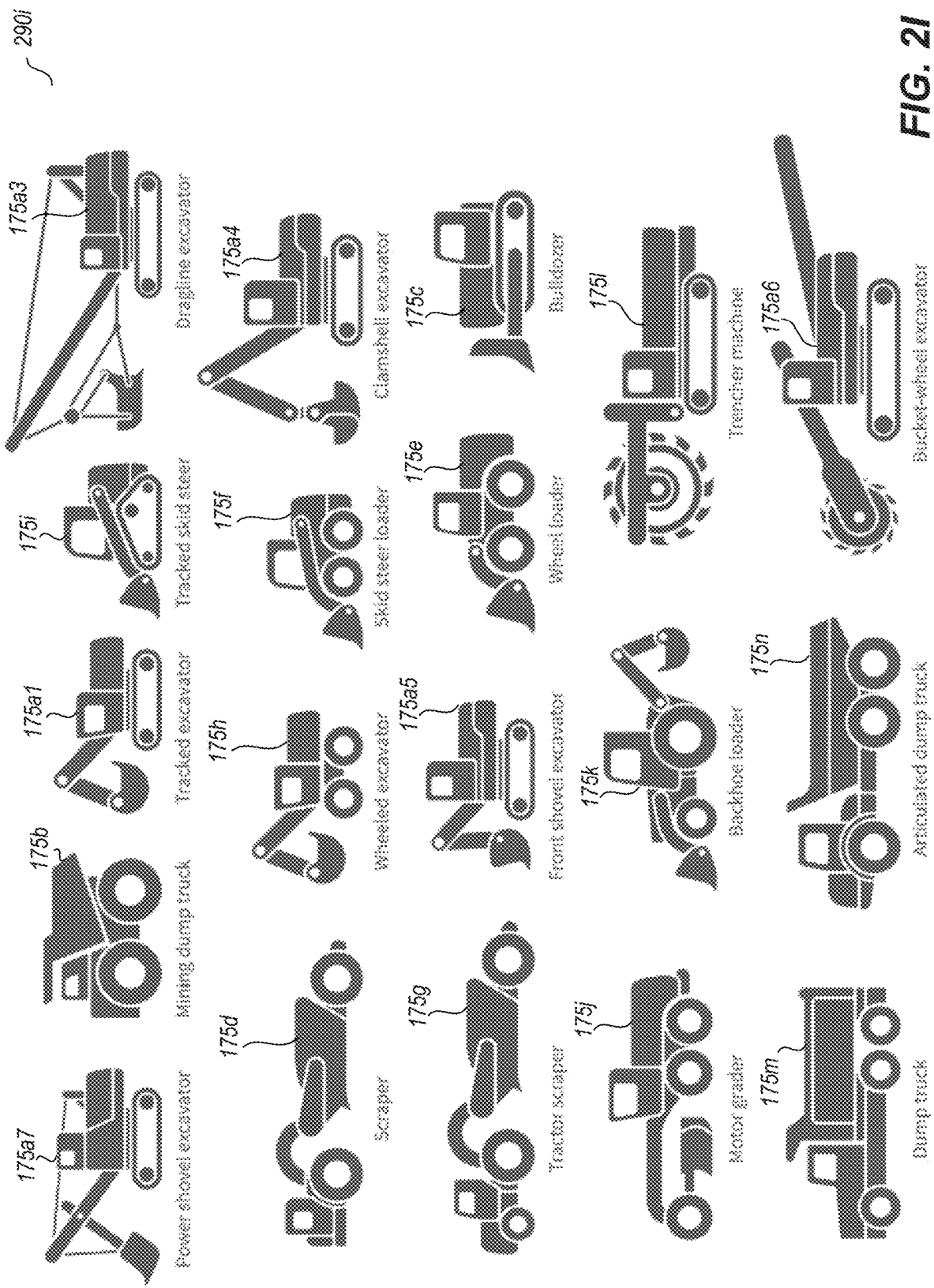

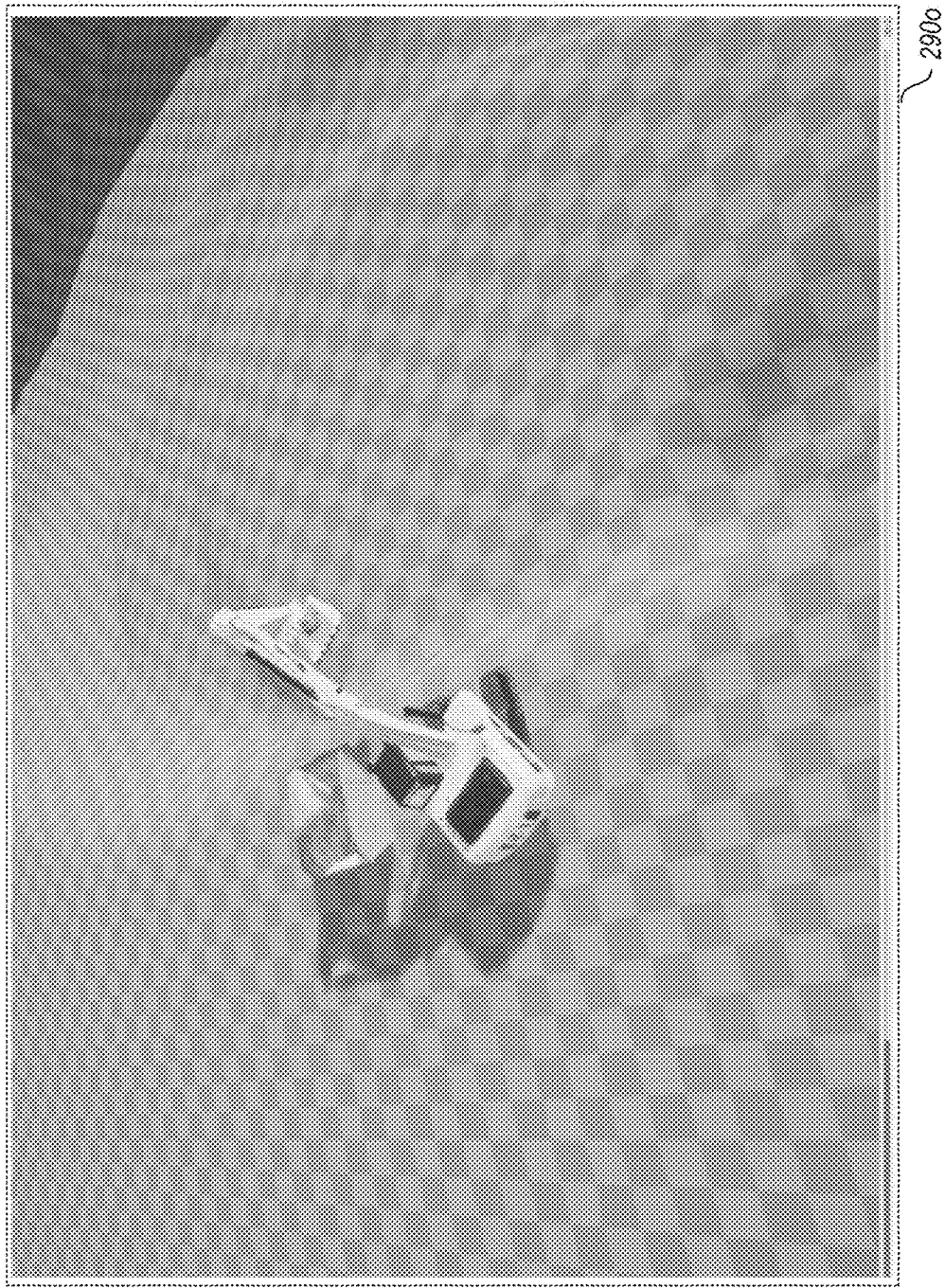
FIG. 2-O

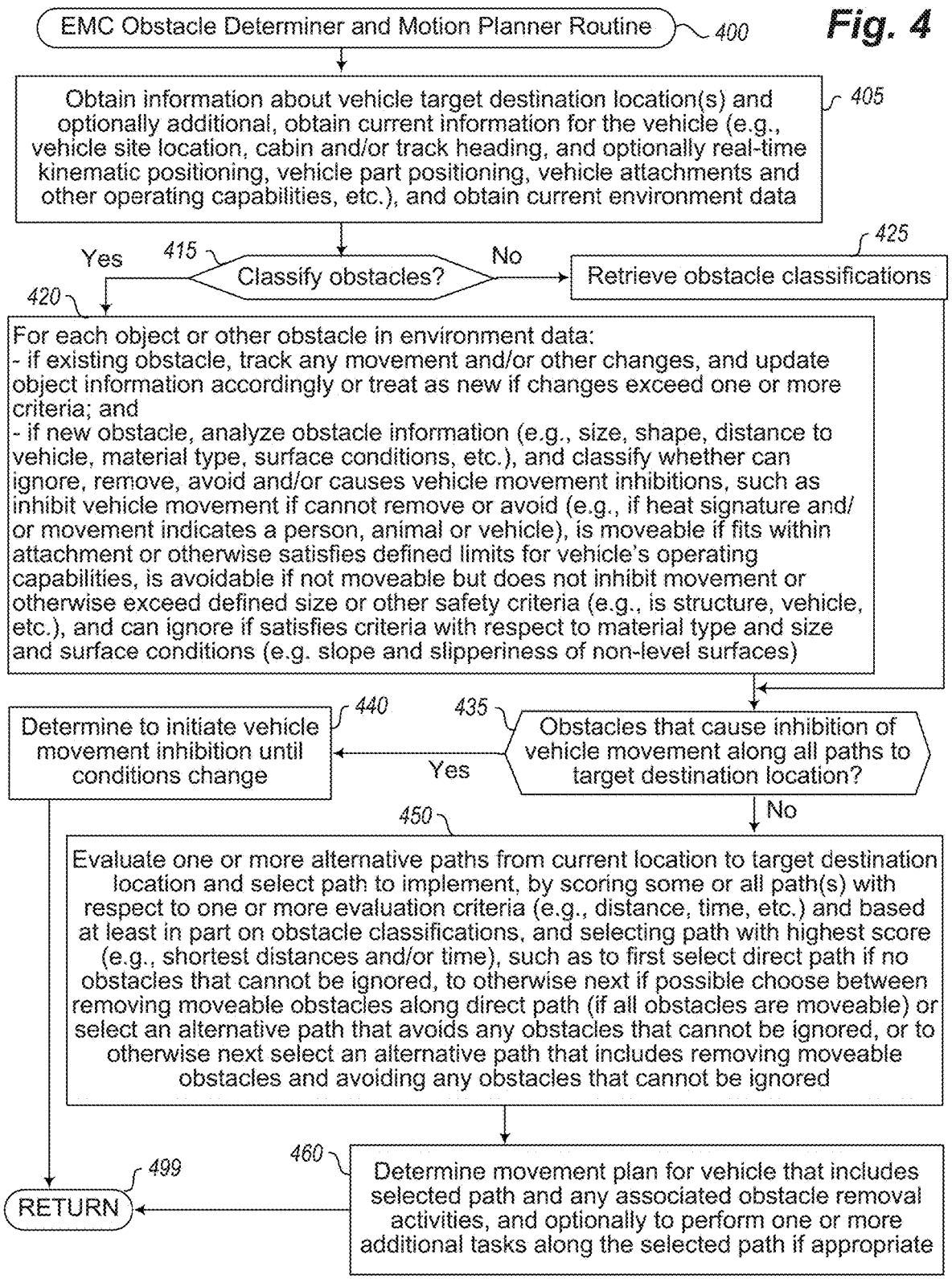

AUTONOMOUS CONTROL OF ON-SITE MOVEMENT OF POWERED EARTH-MOVING CONSTRUCTION OR MINING VEHICLES

CROSS REFERENCE TO RELATED APPLICATIONS

This application claims the benefit of U.S. Provisional Patent Application No. 63/318,774, filed Mar. 10, 2022 and entitled "Autonomous Control Of On-Site Movement Of An Earth-Moving Construction Vehicle," which is hereby incorporated by reference in its entirety.

TECHNICAL FIELD

The following disclosure relates generally to systems and techniques for autonomous control of powered earth-moving vehicles, such as to determine and implement autonomous operations of one or more powered earth-moving construction and/or mining vehicles on a site that include determining and controlling movement around the site when faced with on-site obstacles.

BACKGROUND

Earth-moving construction vehicles (e.g., loaders, excavators, bulldozers, deep sea machinery, extra-terrestrial machinery, etc.) may be used on a job site to move soil and other materials (e.g., gravel, rocks, asphalt, etc.) and to perform other operations, and are each typically operated by a human operator (e.g., a human user present inside a cabin of the construction vehicle, a human user at a location separate from the construction vehicle but performing interactive remote control of the construction vehicle, etc.). Similarly, earth-moving mining vehicles may be used to extract or otherwise move soil and other materials (e.g., gravel, rocks, asphalt, etc.) and to perform other operations, and are each typically operated by a human operator (e.g., a human user present inside a cabin of the mining vehicle, a human user at a location separate from the mining vehicle but performing interactive remote control of the mining vehicle, etc.).

Limited autonomous operations (e.g., performed under automated programmatic control without human user interaction or intervention) of some construction and mining vehicles have occasionally been used, but existing techniques suffer from a number of problems, including the use of limited types of sensed data, an inability to perform fully autonomous operations when faced with on-site obstacles, an inability to coordinate autonomous operations between multiple on-site construction and/or mining vehicles, requirements for bulky and expensive hardware systems to support the limited autonomous operations, etc.

BRIEF DESCRIPTION OF THE DRAWINGS

FIGS. 2A-2I illustrate examples of powered earth-moving construction and/or mining vehicles having multiple types of on-vehicle data sensors positioned to support autonomous operations on a site.

FIGS. 2J-2S illustrate examples of autonomous operations and associated data used for controlling movement of a powered earth-moving vehicle between locations on a site.

FIG. 4 is an example flow diagram of an illustrated embodiment of an EMVAMC Obstacle Determiner and Motion Planner component routine.

DETAILED DESCRIPTION

Figure 1A:
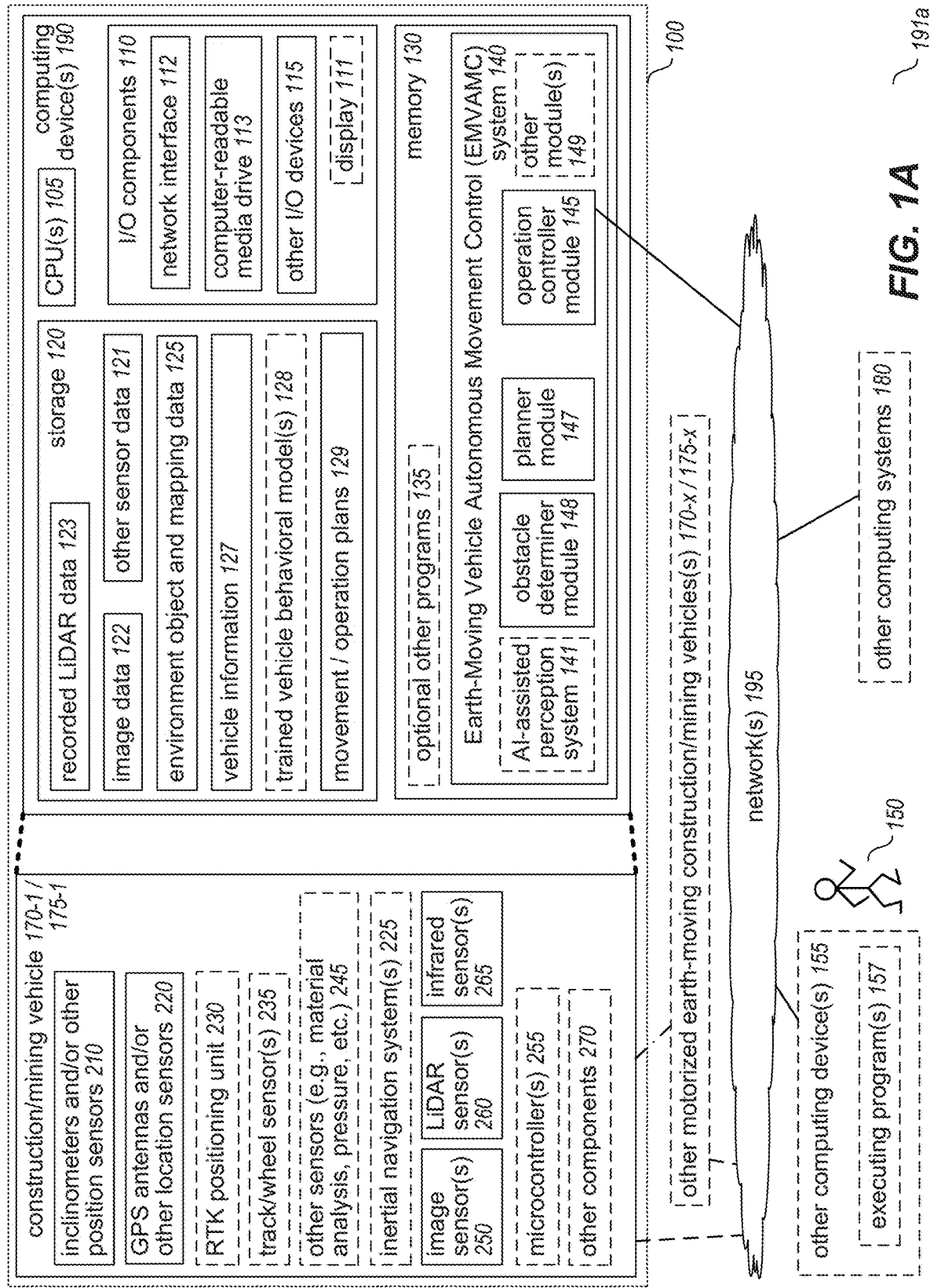
FIG. 1A is a network diagram illustrating an example embodiment of using described systems and techniques to determine and implement autonomous operations of one or more powered earth-moving vehicles on a site based at least in part on using data gathered by on-vehicle sensors.

Systems and techniques are described for implementing autonomous control of operations of powered earth-moving vehicles (e.g., construction and/or mining vehicles) on a site, such as to automatically determine and control movement of one or more powered earth-moving vehicles around a job site when faced with possible on-site obstacles, including in some situations to further automatically determine and control autonomous movement of moveable parts of one or more such vehicles (e.g., a vehicle's arm(s) and/or attachment(s), such as a digging bucket, claw, hammer, blade, etc.). In at least some embodiments, the described systems and techniques are used to determine and implement autonomous operations of one or more powered earth-moving vehicles, including in some situations to implement coordinated actions of multiple powered earth-moving vehicles of one or more types (e.g., one or more excavator vehicles, bulldozer vehicles, front loader vehicles, grader vehicles, loader vehicles, crane vehicles, backhoe vehicles, compactor vehicles, conveyor vehicles, dump trucks or other truck vehicles, etc.). As one non-exclusive example, the described systems and techniques may in some embodiments include obtaining and integrating data from sensors of multiple types positioned on a powered earth-moving vehicle at a site, and using the data to determine and control movement of the powered earth-moving vehicle around the site, such as by determining current location and positioning of the powered earth-moving vehicle and its moveable parts on the site, determining a target destination location and/or route (or 'path') of the powered earth-moving vehicle on the site, identifying and classifying objects and other obstacles (e.g., man-made structures, rocks and other naturally occurring impediments, other equipment, people or animals, etc.) along one or more possible paths (e.g., multiple alternative paths between current and destination locations), and implementing actions to address any such obstacles. Additional details related to implementing autonomous control of powered earth-moving vehicles in particular manners are described below, and some or all of the described techniques are performed in at least some embodiments by automated operations of an Earth-Moving Vehicle Autonomous Movement Control ("EMVAMC") system to control one or more powered earth-moving vehicles (e.g., an EMVAMC system operating on at least one of the one or more powered earth-moving vehicles being controlled).

As noted above, in at least some embodiments, data may be obtained and used by the EMVAMC system from sensors of multiple types that are positioned on or near one or more powered earth-moving vehicles, such as one or more of the following: GPS data or other location data; inclinometer data or other position data for particular movable parts of an earth-moving vehicle (e.g., a digging arm/attachment of an earth-moving vehicle); real-time kinematic (RTK) positioning information based on GPS data and/or other positioning data that is corrected using RTK-based GPS correction data transmitted via signals from a base station (e.g., at a location remote from the site at which the vehicle is located); track and cabin heading data; visual data of captured image(s) using visible light; depth data from depth-sensing and proximity devices such as LiDAR (e.g., depth and position data for points visible from the LiDAR sensors, such as three-dimensional, or "3D", points corresponding to surfaces of terrain and objects) and/or other than LiDAR (e.g., ground-penetrating radar, above-ground radar, other laser rangefinding techniques, synthetic aperture radar or other types of radar, sonar, structured light, etc.); infrared data from infrared sensors; material type data for loads and/or a surrounding environment from material analysis sensors; load weight data from pressure sensors; etc. As one non-exclusive example, the described systems and techniques may in some embodiments include obtaining and integrating data from sensors of multiple types positioned on a powered earth-moving vehicle at a site, and using the data to determine and control operations of the vehicle to accomplish one or more defined tasks at the site, including determining current location and positioning of the vehicle on the site, determining and implementing movement around the site, determining and implementing operations involving use of the vehicle's attachment(s) and/or arms (e.g., hydraulic arms), etc. Such powered earth-moving construction vehicles (e.g., one or more tracked or wheeled excavators, bulldozers, tracked or wheeled skid loaders or other loaders such as front loaders and backhoe loaders, graders, cranes, compactors, conveyors, dump trucks or other trucks, deep sea construction machinery, extra-terrestrial construction machinery, etc.) and powered earth-moving mining vehicles (e.g., one or more tracked or wheeled excavators, bulldozers, tracked or wheeled skid loaders and other loaders such as front loaders and backhoe loaders, scrapers, graders, cranes, trenchers, dump trucks or other trucks, deep sea mining machinery, extra-terrestrial mining machinery, etc.) are referred to generally as 'earth-moving vehicles' herein, and while some illustrative examples are discussed below with respect to controlling one or more particular types of vehicles (e.g., excavator vehicles, wheel loaders or other loader vehicles, dump truck or other truck vehicles, etc.), it will be appreciated that the same or similar techniques may be used to control one or more other types of powered earth-moving vehicles. With respect to sensor types, one or more types of GPS antennas and associated components may be used to determine and provide GPS data in at least some embodiments, with one non-exclusive example being a Taoglas MagmaX2 AA.175 GPS antenna. In addition, one or more types of LiDAR devices may be used in at least some embodiments to determine and provide depth data about an environment around an earth-moving vehicle (e.g., to determine a 3D, or three-dimensional, model of some or all of a job site on which the vehicle is situated), with non-exclusive examples including LiDAR sensors of one or more types from Livox Tech. (e.g., Mid-70, Avia, Horizon, Tele-15, Mid-40, Mid-100, HAP, etc.) and with corresponding data optionally stored using Livox's LVX point cloud file format v1.1, LiDAR sensors of one or more types from Ouster Inc. (e.g., OS0 and/or OS1 and/or OS2 sensors), etc.—in some embodiments, other types of depth-sensing and/or 3D modeling techniques may be used, whether in addition to or instead of LiDAR, such as using other laser rangefinding techniques, synthetic aperture radar or other types of radar, sonar, image-based analyses (e.g., SLAM, SfM, etc.), structured light, etc. Furthermore, one or more proximity sensor devices may be used to determine and provide short-distance proximity data in at least some embodiments, with one non-exclusive example being an LJ12A3-4-Z/BX inductive proximity sensor from ETT Co., Ltd. Moreover, real-time kinematic positioning information may be determined from a combination of GPS data and other positioning data, with one non-exclusive example including use of a u-blox ZED-F9P multi-band GNSS (global navigation satellite system) RTK positioning component that receives and uses GPS, GLONASS, Galileo and BeiDou data, such as in combination with an inertial navigation system (with one non-exclusive example including use of MINS300 by BW Sensing) and/or a radio that receives RTK correction data (e.g., a Digi XBee SX 868 RF module). Other hardware components that may be positioned on or near an earth-moving vehicle and used to provide data and/or functionality used by the EMVAMC system include the following: one or more inclinometers (e.g., single axis and/or double axis) or other accelerometers (with one non-exclusive example including use of an inclination sensor by DIS sensors, such as the QG76 series); a CAN bus message transceiver (e.g., a TCAN 334 transceiver with CAN flexible data rate); one or more low-power microcontrollers (e.g., an i.MX RT1060 Arm-based Crossover MCU microprocessor from NXP Semiconductors, a PJRC Teensy 4.1 Development Board, a Grove 12-bit Magnetic Rotary Position Sensor AS5600, etc.) or other hardware processors, such as to execute and use executable software instructions and associated data of the EMVAMC system; one or more voltage converters and/or regulators (e.g., an ST LD1117 adjustable and fixed low drop positive voltage regulator, an ST LM217 or LM317 adjustable voltage regulator, etc.); a voltage level shifter (e.g., a Fairchild Semiconductor BSS138 N-Channel Logic Level Enhancement Mode Field Effect Transistor); etc. In addition, in at least some embodiments and situations, one or more types of data from one or more sensors positioned on an earth-moving vehicle may be combined with one or more types of data (whether the same types of data and/or other types of data) acquired from one or more positions remote from the earth-moving vehicle (e.g., from an overhead location, such as from a drone aircraft, an airplane, a satellite, etc.; elsewhere on a site on which the earth-moving vehicle is located, such as at a fixed location and/or on another earth-moving vehicle of the same or different type; etc.), with the combination of data used in one or more types of autonomous operations as discussed herein. Additional details are included below regarding positioning of data sensors and use of corresponding data, including with respect to the examples of FIGS. 2A-2I.

As is also noted above, automated operations of an EMVAMC system may include determining current location and other positioning of a powered earth-moving vehicle on a site in at least some embodiments. As one non-exclusive example, such position determination may include using one or more track sensors to monitor whether or not a vehicle's tracks are aligned in the same direction as the vehicle's cabin and/or chassis, and using GPS data (e.g., from 3 GPS antennas located on the vehicle's cabin and/or chassis, such as in a manner similar to that described with respect to FIGS. 2A-2G) optionally in conjunction with inertial navigation system to determine the rotation of the cabin and/or chassis (e.g., relative to true north). When using data from multiple GPS antennas, the data may be integrated in various manners, such as by using a microcontroller located on the powered earth-moving vehicle (e.g., using the 'Sparkfun'

GPS Arduino library from u-blox for the GPS receiver), and with additional RTK (real-time kinetic) positioning data optionally used to reinforce and provide further precision with respect to the GPS-based location (e.g., to achieve 1-inch precision or better). In addition, in some embodiments and situations, LiDAR data is used to assist in position determination operations, such as by surveying the surrounding environment around the powered earth-moving vehicle (e.g., some or all of a job site on which the powered earth-moving vehicle is located, such as terrain of the job site and objects on the job site) and confirming a current location of the powered earth-moving vehicle in two-dimensional ("2D") and/or three-dimensional ("3D") space, whether an absolute location (e.g., using GPS locations) and/or a relative location (e.g., using the vehicle or other element as a center point relative to which other points are mapped), and in some cases relative to a 2D and/or 3D map of the job site generated from the LiDAR data and/or from analysis of visual data of images (e.g., a 3D point cloud having a plurality of data points each with an associated position in 3D space and representing a point on a surface, such as the ground or other terrain, an obstacle or other object above the ground, etc.; other types of 3D representations, such as meshes, planar surfaces or other types of surfaces, parametric models, depth-maps, RGB-D, voxels, etc.; 2D point clouds and/or other 2D representations; etc.). Additional details are included below regarding such automated operations to determine current location and other positioning of a powered earth-moving vehicle on a site.

In addition, automated operations of an EMVAMC system may further include determining a target destination location and/or path of a powered earth-moving vehicle on a job site or other geographical area. For example, in some embodiments the EMVAMC system may include one or more planner components, and at least one such planner component determines a current target destination location and/or path of a powered earth-moving vehicle (e.g., in accordance with other goals or planning operations being performed by the EMVAMC system, such as based on an overall analysis of a site and/or as part of accomplishing a group of multiple activities at the site). In addition, the movement of the powered earth-moving vehicle from a current location to a target destination location or otherwise along a determined path may be initiated in various manners, such as by an operator component of the EMVAMC system that acts in coordination with the one or more planner components (e.g., based on a planner component providing instructions to the operator component about current work to be performed, such as work for a current day that involves the powered earth-moving vehicle leaving a current work area and moving to a new area to work), or directly by a planner component (e.g., to move to a new location along a track to level terrain and prepare for digging). In other embodiments, determination of a target destination location and/or path and initiation of powered earth-moving vehicle movement may be performed in other manners, such as in part or in whole based on input received from one or more human users or other sources. Additional details are included below regarding such automated operations to determine a target destination location and/or path of a powered earth-moving vehicle on a site, including with respect to the example of FIG. 2R.

Automated operations of an EMVAMC system may further in at least some embodiments include identifying and classifying obstacles (if any) along one or more paths between current and destination locations, and implementing actions to address any such obstacles. For example, LiDAR data (or other depth-sensing data) and/or visual data may be analyzed to identify objects that are possible obstacles and as part of classifying a type of each obstacle, and other types of data (e.g., infrared, material type, etc.) may be further used as part of classifying an obstacle type (e.g., to determine whether an obstacle is a human or animal, such as based at least in part by having a temperature above at least one first temperature threshold, whether an absolute temperature threshold or a temperature threshold relative to a temperature of a surrounding environment; whether an obstacle is a running vehicle, such as based at least in part by having a temperature above at least one second temperature threshold, whether an absolute temperature threshold or a temperature threshold relative to a temperature of a surrounding environment; to estimate weight and/or other properties based at least in part on one or more types of material of the obstacle; etc.), and in some embodiments and situations by using one or more trained machine learning models (e.g., using a point cloud analysis routine for object classification) or via other types of analysis (e.g., image analysis techniques). As one non-exclusive example, each obstacle may be classified on a scale from 1 (easy to remove) to 10 (not passable), including to consider factors such as whether an obstacle is a human or other animal, is another vehicle that can be moved (e.g., using coordinated autonomous operation of the other vehicle), is infrastructure (e.g., cables, plumbing, etc.), based on obstacle size (e.g., using one or more size thresholds) and/or obstacle material (e.g., is water, oil, soil, rock, etc.) and/or other obstacle attribute, etc., as discussed further below. Such classifying of obstacles may further be used as part of determining a path between a current location and a target destination location, such as to select or otherwise determine one or more of multiple alternative paths to use if one or more obstacles are of a sufficiently high classified type (e.g., not capable of being moved by the earth-moving vehicle, such as at all or within a defined amount of time and/or other defined limits, as such as being of class 7 of 10 or higher) are present along what would otherwise be at least one possible path (e.g., a direct path between the current location and the target destination location). For example, depending on information about an obstacle (e.g., a type, distance, shape, depth, material type, etc.), the automated operations of the EMVAMC system may determine to, as part of the autonomous operations of the powered earth-moving vehicle, perform at least one of (1) removing the obstacle from a path and moving along that path to the target destination location, or (2) moving in an optimized path around the obstacle to the target destination location, or (3) inhibiting movement of the powered earth-moving vehicle, and in some cases, to instead initiate autonomous operations of a separate second powered earth-moving vehicle to move to the target destination location and/or to initiate a request for human intervention. Additional details are included below regarding such automated operations to classify obstacles and to use such information as part of path determination and corresponding powered earth-moving vehicle actions.

Thus, in one non-exclusive embodiment, a system and techniques may be provided that is used for controlling a powered earth-moving vehicle at an excavation site or other job site to cause it to move to a target destination location on the site from a current location on the site, comprising: a real-time kinematic (RTK) radio mounted on the powered earth-moving vehicle to receive RTK-based GPS correction data from a remote base station; a plurality of GPS receivers mounted at a plurality of respective positions on a chassis of a body of the powered earth-moving vehicle to receive GPS signals and to use the RTK-based GPS correction data to determine and provide updated GPS coordinate data for the respective positions; a microcontroller mounted on the powered earth-moving vehicle to compute a cabin heading direction of a cabin of the powered earth-moving vehicle relative to a defined geographical direction and based at least in part on the updated GPS coordinate data; a track sensor mounted on the cabin to determine that the cabin heading direction is different than a track direction of one or more tracks of the powered earth-moving vehicle; a LiDAR component configured to obtain LiDAR data and to detect distance and shape of an obstacle located between the current position and the target destination location; an image capture device mounted on the cabin to capture one or more images of the obstacle; an obstacle classifier component (e.g., a component of the EMVAMC system) that is configured to classify a type of the obstacle based at least in part on visual data of the one or more images; and a planner component (e.g., a component of the EMVAMC system) that is configured to generate the target destination location for the powered earth-moving vehicle, and to initiate autonomous operations of the powered earth-moving vehicle that are based at least in part on the distance and shape of the obstacle and that include at least one of (1) removing the obstacle and moving in a direct path to the target destination location, or (2) moving in an optimized path around the obstacle to the target destination location, or (3) inhibiting movement of the powered earth-moving vehicle; and wherein the microcontroller is configured to initiate autonomous operations that include, before moving of the powered earth-moving vehicle, rotating of the cabin until an updated cabin heading direction matches the track direction. The system of this non-exclusive embodiment may include further configuration of the planner component to, if the initiated autonomous operation of the powered earth-moving vehicle includes the inhibiting of the movement of the powered earth-moving vehicle, initiate autonomous operations of a separate second powered earth-moving vehicle to move to the target destination location. The system of this non-exclusive embodiment may include further configuration of the planner component to, if the obstacle is another construction vehicle, implementing the removing of the obstacle by providing instructions to the other construction vehicle to initiate autonomous operations to move out of the direct path. The system of this non-exclusive embodiment may further include one or more infrared sensors mounted on the powered earth-moving vehicle to obtain infrared data for the obstacle. The system of this non-exclusive embodiment may include further configuration of the planner component to, if the obtained infrared data for the obstacle is above a defined temperature threshold, initiate the inhibiting of the movement of the powered earth-moving vehicle. The system of this non-exclusive embodiment may further include one or more storage devices storing software instructions that, when executed by at least one hardware processor, cause the at least one hardware processor to implement at least some operations of the planner component. The system of this non-exclusive embodiment may further include additional software instructions stored on the one or more storage devices that, when executed by the at least one hardware processor, cause the at least one hardware processor to implement at least some operations of the obstacle classifier component. The system of this non-exclusive embodiment may further include one or more storage devices with stored software instructions that, when executed by at least one hardware processor, cause the at least one hardware processor to implement automated operations of an Earth-Moving Vehicle Autonomous Movement Control system, and wherein the planner component and the obstacle classifier component are part of the Earth-Moving Vehicle Autonomous Movement Control system. The system of this non-exclusive embodiment may further include a plurality of inclinometer sensors mounted at a plurality of respective additional positions on at least one of a digging boom or a digging arm or a digging arm attachment of the powered earth-moving vehicle to provide inclinometer data in at least one dimension for the respective additional positions. The system of this non-exclusive embodiment may further include one or both of the powered earth-moving vehicle or the second powered earth-moving vehicle.

In addition, while the autonomous operations of a powered earth-moving vehicle controlled by the EMVAMC system may in some embodiments be fully autonomous and performed without any input or intervention of any human users (e.g., fully implemented by an embodiment of the EMVAMC system executing on that powered earth-moving vehicle without receiving human input and without receiving external signals other than possibly one GPS signals and RTK correction signals), in other embodiments the autonomous operations of a powered earth-moving vehicle controlled by the EMVAMC system may include providing information to one or more human users about the operations of the EMVAMC system and optionally receiving information from one or more such human users (whether on-site or remote from the site) that are used as part of the automated operations of the EMVAMC system (e.g., a target destination location, a high-level work plan, etc.), such as via one or more GUIs ("graphical user interfaces") displayed on one or more computing device that provide user-selectable controls and other options to allow a user to interactively request or specify types of information to display and/or to interactively provide information for use by the EMVAMC system.

For illustrative purposes, some embodiments are described below in which specific types of data are acquired and used for specific types of automated operations performed for specific types of powered earth-moving vehicles, and in which specific types of autonomous operation activities are performed in particular manners. However, it will be understood that such described systems and techniques may be used with other types of data and powered earth-moving vehicles and associated autonomous operation activities in other manners in other embodiments, and that the invention is thus not limited to the exemplary details provided. In addition, the terms "acquire" or "capture" or "record" as used herein with reference to sensor data may refer to any recording, storage, or logging of media, sensor data, and/or other information related to a powered earth-moving vehicle or job site or other location or subsets thereof (unless context clearly indicates otherwise), such as by a recording device or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

FIG. 1A is a diagram illustrating an example embodiment of an EMVAMC ("Earth-Moving Vehicle Autonomous Movement Control") system 140 that may be used to implement at least some of the described systems and techniques for implementing autonomous control of powered earth-moving vehicles, such as to automatically determine and control movement of one or more powered earth-moving vehicles around a site when faced with possible on-site obstacles. The EMVAMC system 140 may be implemented on one or more hardware processors 105, such as one or more network-accessible configured computing devices 190, and whether integrated 100 with a particular powered earth-moving construction vehicle 170-1 and/or powered earth-moving mining vehicle 175-1 (e.g., located on that powered earth-moving vehicle) or with multiple powered earth-moving vehicles 170 and/or 175 (e.g., operating in a distributed manner on the multiple vehicles, such as one computing device 190 on each of the multiple vehicles that are interacting in a peer-to-peer manner), or instead remote from one or more such powered earth-moving vehicles 170 and/or 175 (e.g., in communication with one or more such powered earth-moving vehicles over one or more networks 195). In some embodiments, one or more other computing devices or systems may further interact with the EMVAMC system 140 (e.g., to obtain and/or provide information), such as one or more other computing devices 155 each having one or more associated users, and/or one or more other computing systems 180 (e.g., to store and provide data, to provide supplemental computing capabilities, etc.). The one or more computing devices 190 may include any computing device or system that may receive data and/or requests, and take corresponding actions (e.g., store the data, respond to the request, etc.) as discussed herein. The earth-moving vehicle(s) 170 and/or 175 may correspond to various types of vehicles and have various forms, such as are illustrated in FIGS. 2A-2I.

In this example, the powered earth-moving vehicle 170-1 or 175-1 includes a variety of sensors to obtain and determine information about the powered earth-moving vehicle and its surrounding environment (e.g., a job site on which the powered earth-moving vehicle is located), including one or more GPS antennas and/or other location sensors 220, one or more inclinometers and/or other position sensors 210, one or more image sensors 250 (e.g., visible light sensors that are part of one or more cameras or other image capture devices), one or more LiDAR sensors 260, optionally one or more infrared sensors 265, optionally one or more inertial navigation systems 225, optionally an RTK-enabled GPS positioning unit 230 that receives GPS signals from the GPS antenna(s) and RTK-based correction data from a remote base station (not shown) and optionally other data from one or more other sensors and/or devices (e.g., the inertial navigation system), optionally one or more track or wheel alignment sensors 235, optionally one or more other sensors 245 (e.g., material analysis sensors, pressure sensors, sensors associated with radar and/or ground-penetrating radar and/or sonar, etc.), optionally one or more microcontrollers or other hardware CPUs 255 (e.g., to execute on the vehicle some or all of the objection detection module 148, planner module 147, perception system 141, etc.)

The EMVAMC system 140 obtains some or all of the data from the sensors on the powered earth-moving vehicle 170-1 or 175-1, stores the data in corresponding databases or other data storage formats on storage 120 (e.g., LiDAR data 123, image data 122, other sensor data 121, environment object (e.g., obstacle) and other mapping (e.g., terrain) data 127, vehicle information 127, etc.), and uses the data to perform automated operations involving controlling autonomous operations of the powered earth-moving vehicle 170-1 or 175-1. In this example embodiment, the EMVAMC system 140 has components that include an obstacle determiner module 148 (e.g., to analyze information about potential obstacles in an environment of powered earth-moving vehicle 170-1 or 175-1 and determine corresponding information, such as a classification of the type of the obstacle), a movement planner module 147 (e.g., to determine how to accomplish a goal that includes moving a powered earth-moving vehicle from its current location to a determined target destination location, such as determining how to handle any possible obstacles between the current and destination locations), a system operation manager module 145 (e.g., to control overall operation of the EMVAMC system and/or the vehicle 170-1 and/or 175-1), optionally an AI-assisted perception system 141 (e.g., to analyzing LiDAR and/or visual data of the environment to identify objects and/or determine mapping information for an environment around the vehicle 170-1 and/or 175-1, such as a 3D point cloud, a terrain contour map or other visual map, etc.), and optionally one or more other modules 149 to perform additional automated operations and provide additional capabilities (e.g., analyzing and describing a job site or other surrounding environment, such as quantities and/or types and/or locations and/or activities of vehicles and/or people; one or more GUI modules, including to optionally support one or more VR (virtual reality) headsets/glasses and/or one or more AR (augmented reality) headsets/glasses and/or mixed reality headsets/glasses optionally having corresponding input controllers; etc.), etc. During operation, the EMVAMC system may generate or otherwise obtain various types of additional data and optionally store that additional data on storage 120 or elsewhere, such as movement and optionally other operation plans (e.g., with one or more target destination locations, one or more determined alternative paths, etc. Additional details related to the operation of the EMVAMC system 140 are included elsewhere herein.

In this example embodiment, the one or more computing devices 190 include a copy of the EMVAMC system 140 stored in memory 130 and being executed by one or more hardware CPUs 105—software instructions of the EMVAMC system 140 may further be stored on storage 120 (e.g., for loading into memory 130 at a time of execution), but are not illustrated here. The computing device(s) 190 and EMVAMC system 140 may be implemented using a plurality of hardware components that form electronic circuits suitable for and configured to, when in combined operation, perform at least some of the techniques described herein. In the illustrated embodiment, each computing device 190 includes the one or more hardware CPUs (e.g., microprocessors), storage 120, memory 130, and various input/output ("I/O") components 110, with the illustrated I/O components including a network connection interface 112, a computer-readable media drive 113, optionally a display 111, and other I/O devices 115 (e.g., keyboards, mice or other pointing devices, microphones, speakers, one or more VR headsets and/or glasses with corresponding input controllers, one or more AR headsets and/or glasses with corresponding input controllers, one or more mixed reality headsets and/or glasses with corresponding input controllers, etc.), although in other embodiments at least some such I/O components may not be provided (e.g., if the CPU(s) include one or more microcontrollers). The memory may further include one or more optional other executing software programs 135 (e.g., an engine to provide output to one or more VR and/or AR and/or mixed reality devices and optionally receive corresponding input). The other computing devices 155 and computing systems 180 may include hardware components similar to those of a computing device 190, but with those details being omitted for the sake of brevity.

One or more other powered earth-moving construction vehicles 170-*x* and/or powered earth-moving mining vehicles 175 may similarly be present (e.g., on the same job site as powered earth-moving vehicle 170-1 or 175-1) and include some or all such components 210-270 and/or 105-149 (although not illustrated here for the sake of brevity) and have corresponding autonomous operations controlled by the EMVAMC system 140 (e.g., with the EMVAMC system operating on a single powered earth-moving vehicle and communicating with the other powered earth-moving vehicles via wireless communications, with the EMVAMC system executing in a distributed manner on some or all of the powered earth-moving vehicles, etc.) or by another embodiment of the EMVAMC system (e.g., with each powered earth-moving vehicle having a separate copy of the EMVAMC system executing on that powered earth-moving vehicle and optionally operating in coordination with each other, etc.). The network 195 may be of one or more types (e.g., the Internet, one or more cellular telephone networks, etc.) and in some cases may be implemented or replaced by direct wireless communications between two or more devices (e.g., via Bluetooth; LoRa, or Long Range Radio; etc.). In addition, while the example of FIG. 1A includes various types of data gathered for a powered earth-moving vehicle and its surrounding environment, other embodiments may similarly gather and use other types of data, whether instead of or in addition to the illustrated types of data, including non-exclusive examples of image data in one or more light spectrums, non-light energy data, location data of types other than from satellite-based navigation systems, depth or distance data to the object, color data, sound data, etc. In addition, in some embodiments and situations, different devices and/or sensors may be used to acquire the same or overlapping types of data (e.g., simultaneously), and the EMVAMC system may combine or otherwise use such different types of data, including to determine differential information for a type of data.

Figure 1B:
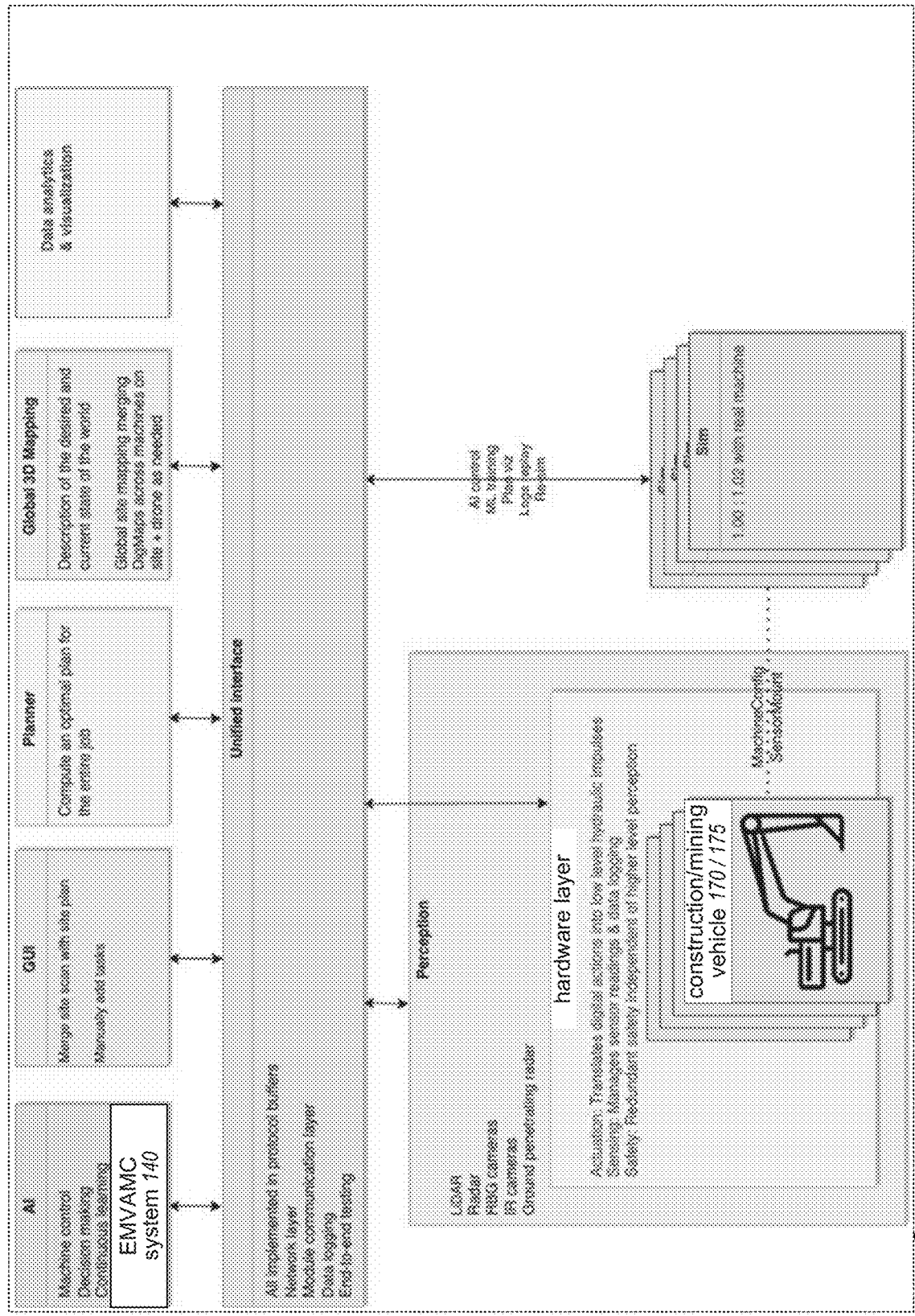
FIG. 1B is a diagram illustrating example components and interactions used to implement autonomous operations of one or more powered earth-moving vehicles on a site.

FIG. 1B illustrates example modules and interactions used to implement autonomous operations of one or more powered earth-moving vehicles on a site, such as to provide an overview of a software and/or hardware architecture used for performing at least some of the described techniques in at least some embodiments. In particular, FIG. 1B illustrates information 191*b* that includes a hardware layer associated with one or more types of powered earth-moving vehicles 170 and/or powered earth-moving mining vehicles 175 (e.g., corresponding to components 210-270 of FIG. 1A), such as to receive instructions about controlling autonomous operation of the earth-moving vehicle(s) 170/175, and to perform actions that include actuation (e.g., translating digital actions into low-level hydraulic impulses), sensing (e.g., to manage sensor readings and data logging), safety (e.g., to perform redundant safety independent of higher-level perception operations), etc. In the illustrated example, the hardware layer interacts with or as part of a perception module, such as to use one or more sensor types to obtain data about the earth-moving vehicle(s) and/or their environment (e.g., LiDAR data, radar data, visual data from one or more RGB camera devices, infrared data from one or more IR sensors, ground-penetrating radar data, etc.). The perception module and/or hardware layer may further interact with a unified interface that connects various modules, such as to operate a network layer and to be implemented in protocol buffers as part of providing a module communication layer, as well as to perform data logging, end-to-end testing, etc. In the illustrated example, the unified interface further interacts with an AI (artificial intelligence) module (e.g., that includes the EMVAMC system 140), a GUI module, a Planner module, a Global 3D Mapping module, one or more Sim simulation modules (e.g., operational data simulator modules that are part of the EMVAMC system 140), and one or more other modules to perform data analytics and visualization. In this example, the AI module provides functionality corresponding to machine control, decision-making, continuous learning, etc. The GUI module perform activities that include providing information of various types to users (e.g., from the EMVAMC system), manually receiving information (e.g., to be provided to the EMVAMC system, to add tasks to be performed, to merge a site scan with a site plan, etc.). The Planner module performs operations that may include computing an optimal plan for an entire job (e.g., with various tasks to be performed in sequence and/or serially), and the Global 3D Mapping module performs activities that may include providing a description of a current state and/or desired state of an environment around the earth-moving vehicle(s), performing global site mapping merging (e.g., using DigMaps across earth-moving vehicles on the site and optionally drones), etc. The one or more Sim modules perform simulations to provide data from simulated operation of the one or more earth-moving vehicles, such as for use in AI control, machine learning neural network training (e.g., for one or more behavioral models), replaying logs, planning visualizations, etc. It will be appreciated that the EMVAMC system may be implemented in other architectures and environments in other embodiments, and that the details of FIG. 1B are provided for illustrative purposes. In addition, while not illustrated in FIG. 1B, in some embodiments one or more specialized versions of the EMVAMC system may be used for particular types of powered earth-moving vehicles, with non-exclusive examples including the following: an Excavator Movement Control (EMC) system to control movement one or more excavator vehicles; an Excavator X Movement Control (EMC-X) system to control a particular construction and/or mining excavator X vehicle; a Dump Truck Movement Control (DTMC) system to control one or more types of construction and/or mining dump truck vehicles; a Dump Truck X Movement Control (DTMC-X) system to control a particular construction and/or mining dump truck X vehicle; a Wheel Loader Movement Control (WLMC) system to control one or more types of construction and/or mining wheel loader vehicles; a Wheel Loader X Movement Control (WLMC-X) system to control a particular construction and/or mining wheel loader X vehicle; one or more other movement control systems specific to particular types of construction and/or mining vehicles other than excavators and dump trucks and wheel loaders; a Construction Vehicle Movement Control (CVMC) system to control some or all types of powered earth-moving construction vehicles; a Mining Vehicle Movement Control (MVMC) system to control some or all types of powered earth-moving mining vehicles; etc.

It will be appreciated that computing devices, computing systems and other equipment (e.g., powered earth-moving vehicle(s) included within FIGS. 1A-1B are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, camera devices and accessories, and various other consumer products that include appropriate communication capabilities. In addition, the functionality provided by the illustrated EMVAMC system 140 may in some embodiments be distributed in various components, some of the described functionality of the EMVAMC system 140 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the EMVAMC system 140 executing on computing device(s) 190) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

FIGS. 2A-2I illustrate examples of earth-moving vehicles and types of on-vehicle data sensors positioned to support autonomous operations on a site.

Figure 2A:
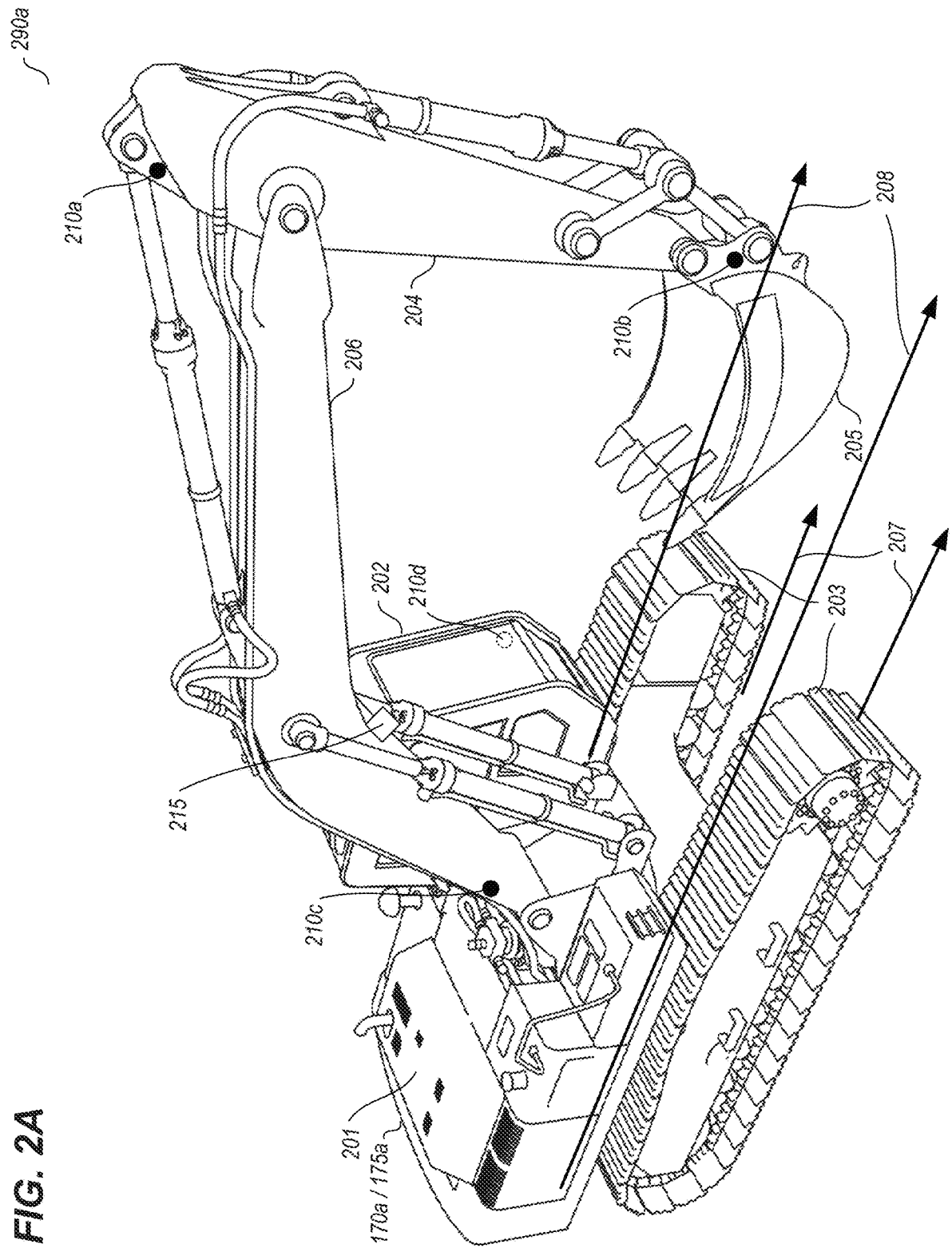

In particular, with respect to FIG. 2A, information 290*a* about an example powered earth-moving construction vehicle 170*a* and/or mining vehicle 175*a* is illustrated, which in this example is a tracked excavator vehicle, using an upper-side-frontal view from the side of the digging boom arm 206 and stick arm (or 'stick') 204 and opposite the side of the cabin 202, with the earth-moving vehicle 170*a*/175*a* further having a main body chassis 201 (e.g., enclosing an engine and counterweight, and including the cabin 202), tracks 203 and bucket (or 'scoop' or 'claw') attachment 205—in other embodiments, digging arm attachments other than a bucket may be used such as, for example, a hydraulic thumb, coupler, breaker, compactor, digging bucket, grading bucket, hammer, demolition grapple, tiltrotator, etc. Four example inclinometers 210 are further illustrated at positions that beneficially provide inclinometer data to compute the position of the bucket and other parts of the digging arms relative to the position of the cabin of the earth-moving vehicle. In this example, three inclinometers 210*a*-210*c* are mounted at respective positions on the digging arms of the earth-moving vehicle (position 210*c* near the intersection of the digging boom arm and the body of the earth-moving vehicle, position 210*b* near the intersection of the digging stick arm and the bucket attachment, and position 210*a* near the intersection of the digging boom and stick arms), such as to use single-axis inclinometers in this example, and with a fourth inclinometer 210*d* mounted within the cabin of the earth-moving vehicle and illustrated at an approximate position using a dashed line, such as to use a dual-axis inclinometer that measures pitch and roll—data from the inclinometers may be used, for example, to track the position of the earth-moving vehicle arms/attachment, including when a track heading direction 207 is determined to be different (not shown in this example) from a cabin/body heading direction 208. This example further illustrates a position of a LiDAR component 215, which in this example is positioned on the underside of the digging boom arm 206 near its bend in the middle, and as such is movable along with the movements of the digging boon arm 206, as well as in some embodiments being independently movable (e.g., to rotate, tilt, swivel, etc.)—in other embodiments, the LiDAR component 215 may be located in other positions on the vehicle 170*a*/175*a* and/or may be one of multiple LiDAR components positioned at different locations on the vehicle. It will be appreciated that other quantities, positionings and types of illustrated sensors/components may be used in other embodiments.

Figure 2B:
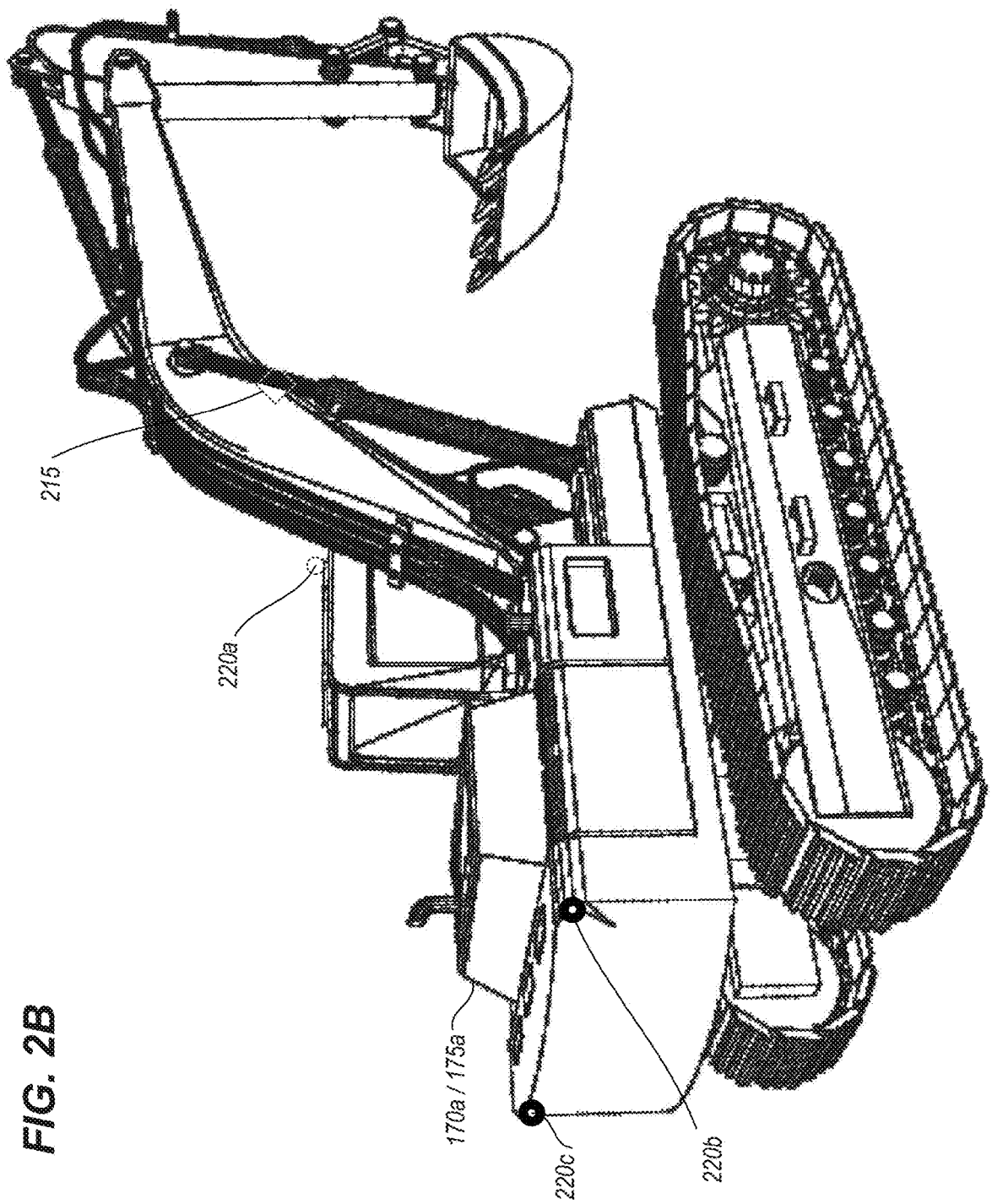

FIGS. 2B and 2C continue the example of FIG. 2A, and illustrate information 290*b* and 290*c*, respectively, about three example GPS antennas 220 at positions that beneficially provide GPS data to assist in determining the positioning and direction of the cabin/body of the earth-moving vehicle 170*a*/175*a*, including to use data from the three GPS antennas to provide greater precision than is available from a single GPS antenna. In this example, the three GPS antennas 220*a*-220*c* are positioned on the earth-moving vehicle body chassis and proximate to three corners of the chassis (e.g., as far apart from each other as possible), such that differential information between GPS antennas 220*a* and 220*c* may provide cabin heading direction information, and differential information between GPS antennas 220*b* and 220c may provide lateral direction information at approximately 90° from that cabin heading direction information. In particular, in FIG. 2B, the example earth-moving vehicle is shown using a side-rear view from the side of the arms, with GPS antennas 220b and 220c illustrated on the back of the body chassis at or below the top of that portion of the body chassis, and with an approximate position of GPS antenna 220a on the cabin top near the front illustrated with dashed lines (e.g., as illustrated further in FIG. 2C). In FIG. 2C, the example earth-moving vehicle is shown using an upper-side-frontal view from the side of the cabin, with GPS antenna 220a shown on the cabin top near the front on the same side as GPS antenna 220c, and with the positions of GPS antennas 220b and 220c illustrated through the body chassis with dashed lines (e.g., just below the top of the back of the body chassis, as illustrated in FIG. 2B). While not illustrated in FIGS. 2B-2C, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the earth-moving vehicle is located) to improve accuracy of the GPS signals from the GPS antennas, so as to be part of one or more RTK-enabled GPS positioning units. The LiDAR component 215 is also illustrated, using dashed lines in FIG. 2B to indicate its location on the underside of the digging boom arm due to the boom arm blocking a direct view of the component 215, and being directly visible in FIG. 2C. FIG. 2C also illustrates possible locations of one or more RGB cameras 217 with image sensors (not shown separately) that gather additional visual data about an environment of the vehicle 170a/175a from visible light—in this example, four cameras are used on top of the cabin (e.g., to in the aggregate provide visual coverage of some or all of 360° horizontally), with two on each side, and optionally with the two front camera facing partially or fully forwards and the two back cameras facing partially or fully backwards, although in other embodiments other camera configurations and/or types may be used (e.g., one or more cameras with panoramic view angles, such as to each cover some or all of 360° horizontally). In at least some embodiments and situations, some or all such cameras may be independently movable (e.g., to rotate, tilt, swivel, etc.) at their positions, and may further in at least some such embodiments be positioned on one or more moveable parts of the vehicle (e.g., a hydraulic arm, attachment, etc.). In addition, in some embodiments and situations, the camera positioning may include having one or two forward-facing cameras (e.g., cameras that each produces perspective rectilinear images and/or video with a standard field of view and that in aggregate cover all or substantially all of the front area around the vehicle, such as all but a small area blocked by a front attachment of the vehicle), and one or two backward-facing camera (e.g., cameras that each produces panoramic images and/or video with a wide-angle field of view of 120° or 150° or 180° or more that covers the back and optionally some or all of the sides of vehicle). It will be appreciated that other quantities, positionings and types of GPS antennas (and/or antennas for other types of satellite-based navigation systems) and/or other sensors/components may be used in other embodiments.

Figure 2D:
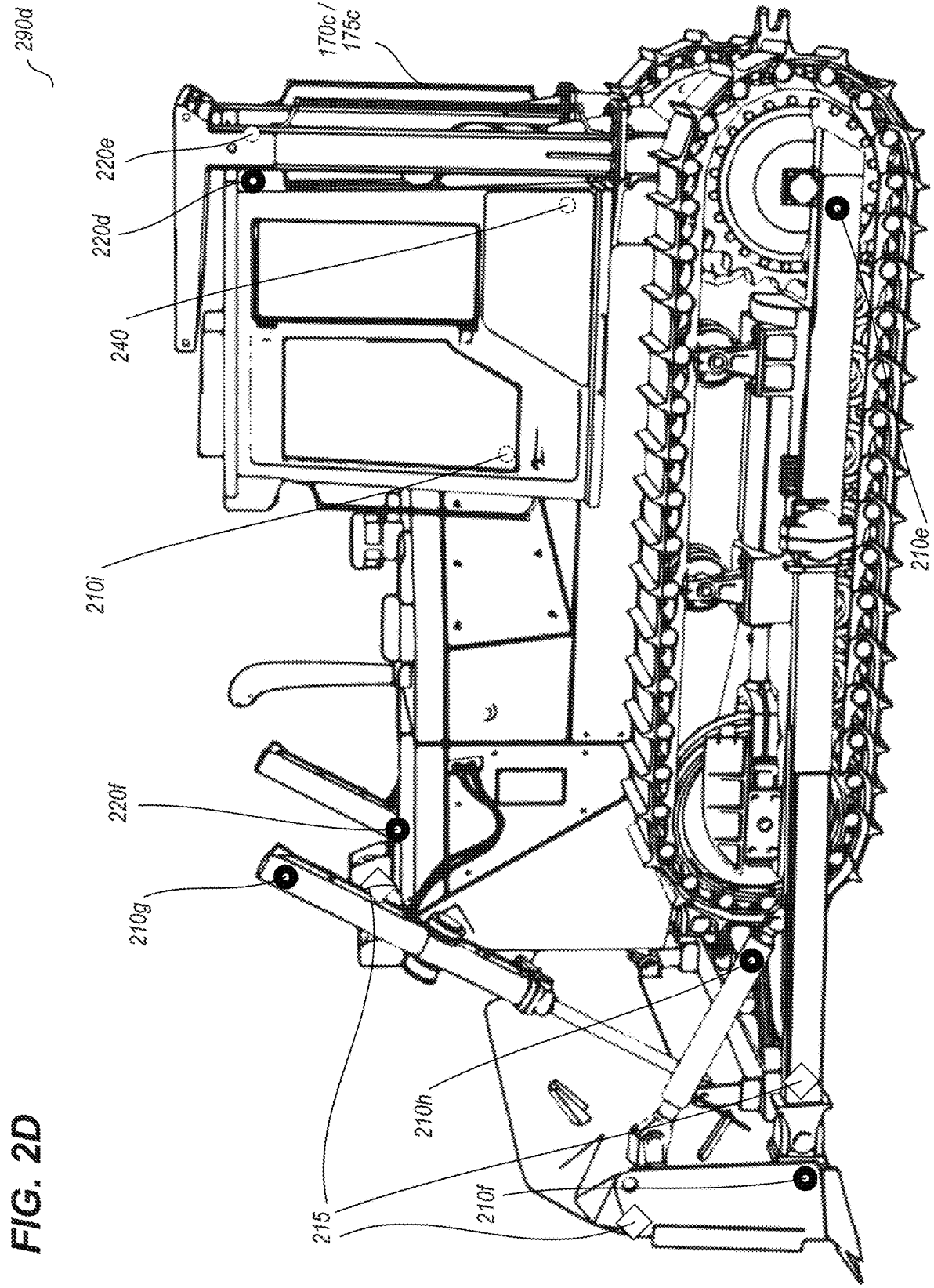
Figure 2E:
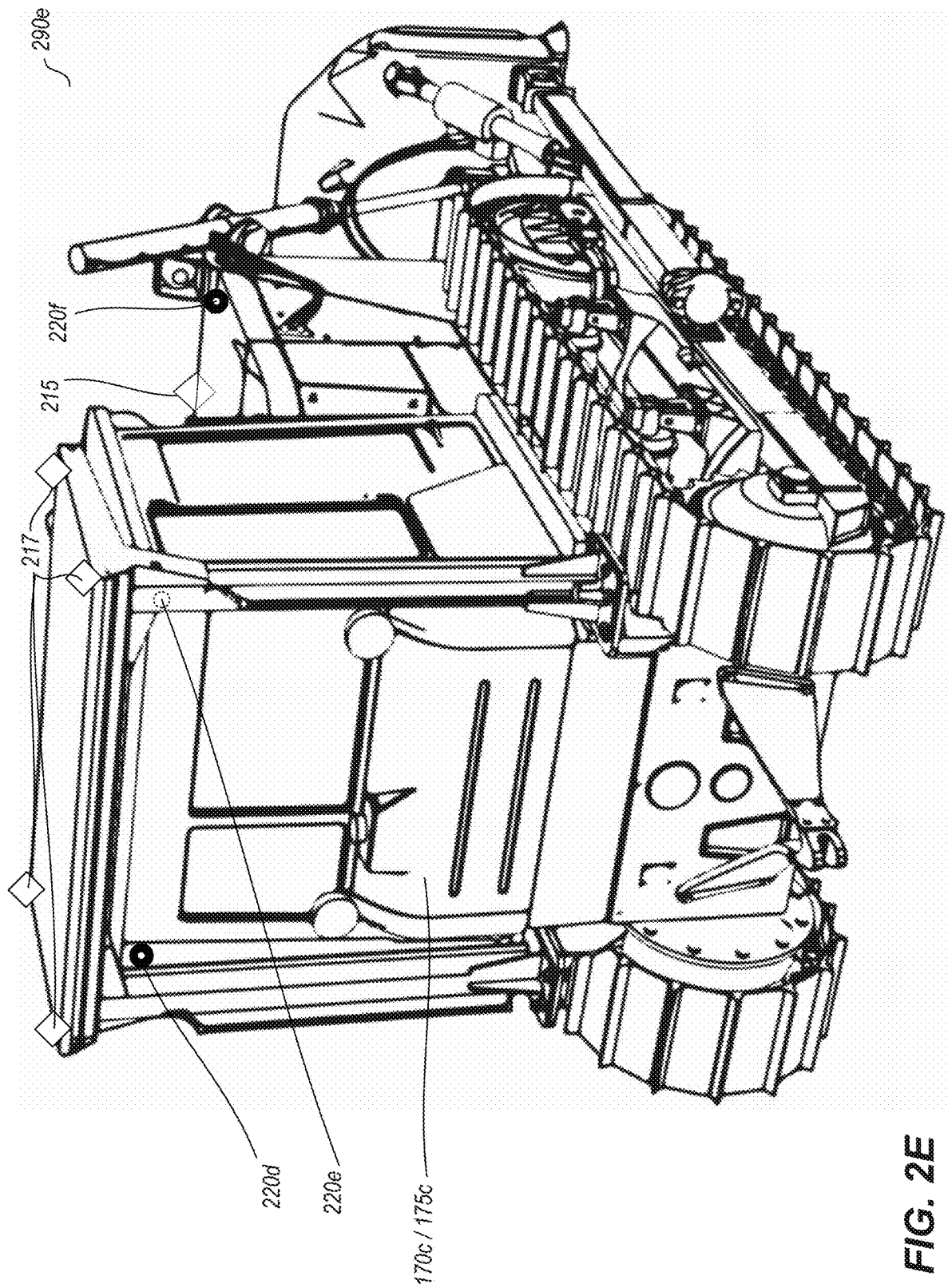

FIGS. 2D-2I continue the examples of FIGS. 2A-2C, with FIGS. 2D and 2E illustrating further example details about another earth-moving construction vehicle 170c and/or mining vehicle 175c, which in this example is a bulldozer vehicle, such as to illustrate example positions for GPS receivers 220 and/or inclinometers 210 and/or one or more LiDAR components 215 and cameras 217. In particular, FIG. 2D illustrates example information 290d that includes various example inclinometers 210e-210i, example GPS antennas/receivers 220d-220f, and possible locations for one or more LiDAR components 215. The example inclinometers 210e-210i are illustrated at positions that beneficially provide inclinometer data to compute the location of the blade or other front attachment (and optionally other parts of the bulldozer, such as the hydraulic arms) relative to the cabin of the bulldozer vehicle (e.g., at position 210e near the intersection of the track spring lifting arm and the body of the vehicle, position 210f near the intersection of the track spring lifting arm and the blade or other attachment, position 210g at one end of a hydraulic arm, position 210h at one end of the tilt cylinder, etc.), such as to use single-axis inclinometers in this example, and with another inclinometer 210i mounted within the cabin of the vehicle and illustrated at an approximate position using a dashed line, such as to use a dual-axis inclinometer that measures pitch and roll—data from the inclinometers may be used, for example, to track the position of the track spring lifting arm and attachment relative to the cabin/body of the vehicle. The example GPS antennas/receivers 220 are illustrated at positions that beneficially provide GPS data to assist in determining the positioning and direction of the cabin/body, including to use data from the three GPS antennas to provide greater precision than is available from a single GPS antenna. In this example, the three GPS antennas 220d-220f are positioned on the body chassis and proximate to three corners of the chassis (e.g., as far apart from each other as possible), such that differential information between GPS antennas 220f and 220e may provide cabin heading direction information, and differential information between GPS antennas 220d and 220e may provide lateral direction information at approximately 90° from that cabin heading direction information. The example one or more LiDAR components 215 are illustrated at one or more possible positions that beneficially provide LiDAR data about some or all of an environment around the vehicle 170c/175c, such as to be positioned on one or more sides of the blade/scoop attachment (e.g., to have a view to the side(s) of the vehicle) and/or a top or bottom (not shown) of the blade/scoop attachment (e.g., to have a view forwards), and/or on sides of one or more of the hydraulic arms (e.g., to have a view to the side(s) of the vehicle), and/or on a front of the chassis (e.g., near the top to have a view forwards over the blade/scoop attachment), etc. FIG. 2E also illustrates possible locations of one or more RGB cameras 217 that gather additional visual data about an environment of the vehicle 170c/175c—in this example, four cameras are used on top of the cabin (e.g., to in the aggregate provide visual coverage of some or all of 360° horizontally), with two on each side, and optionally with the two front camera facing partially or fully forwards and the two back cameras facing partially or fully backwards, although in other embodiments other camera configurations and/or types may be used (e.g., one or more cameras with panoramic view angles, such as to each cover some or all of 360° horizontally). In particular, in FIG. 2D, the example earth-moving vehicle is shown using a side view, with GPS antennas 220d and 220e illustrated on the back of the body chassis at or below the top of that portion of the body chassis (using dashed lines to illustrate position 220e), and with an approximate position of GPS antenna 220f on the chassis top near the front—the positions 220d-220f are further illustrated in information 290e of FIG. 2E, in which the example earth-moving vehicle is shown using an upper-side-back view, with GPS antenna 220f shown on the body top near the front on the same side as GPS antenna 220e. While not illustrated in FIGS. 2D-2E, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the vehicle is located) to improve accuracy of the GPS signals from the GPS antennas, so as to be part of one or more RTK-enabled GPS positioning units. It will be appreciated that other quantities, positionings and types of GPS antennas (and/or antennas for other types of satellite-based navigation systems) and/or inclinometers and/or other sensors/components may be used in other embodiments.

Figure 2F:
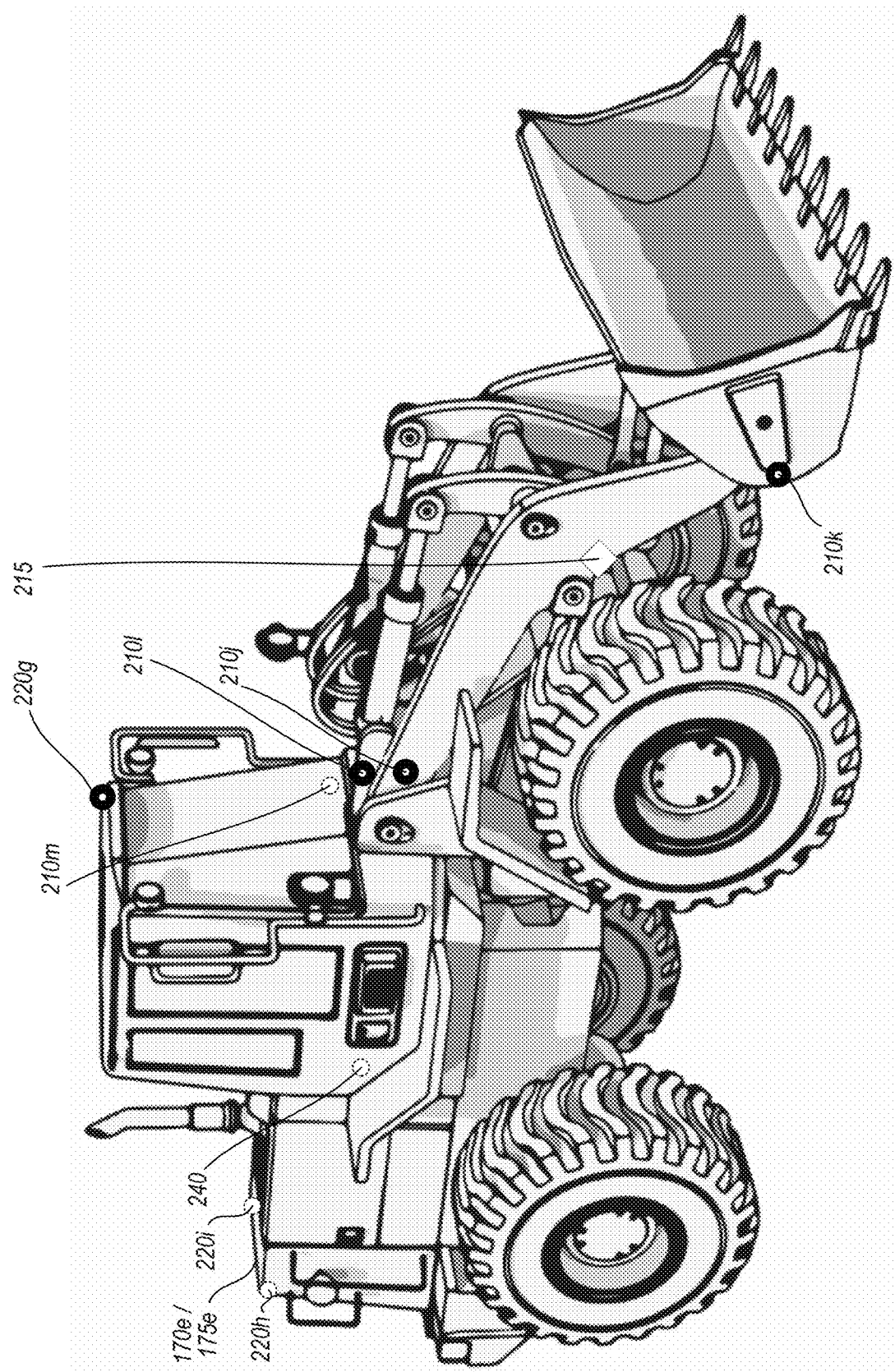
Figure 2G:
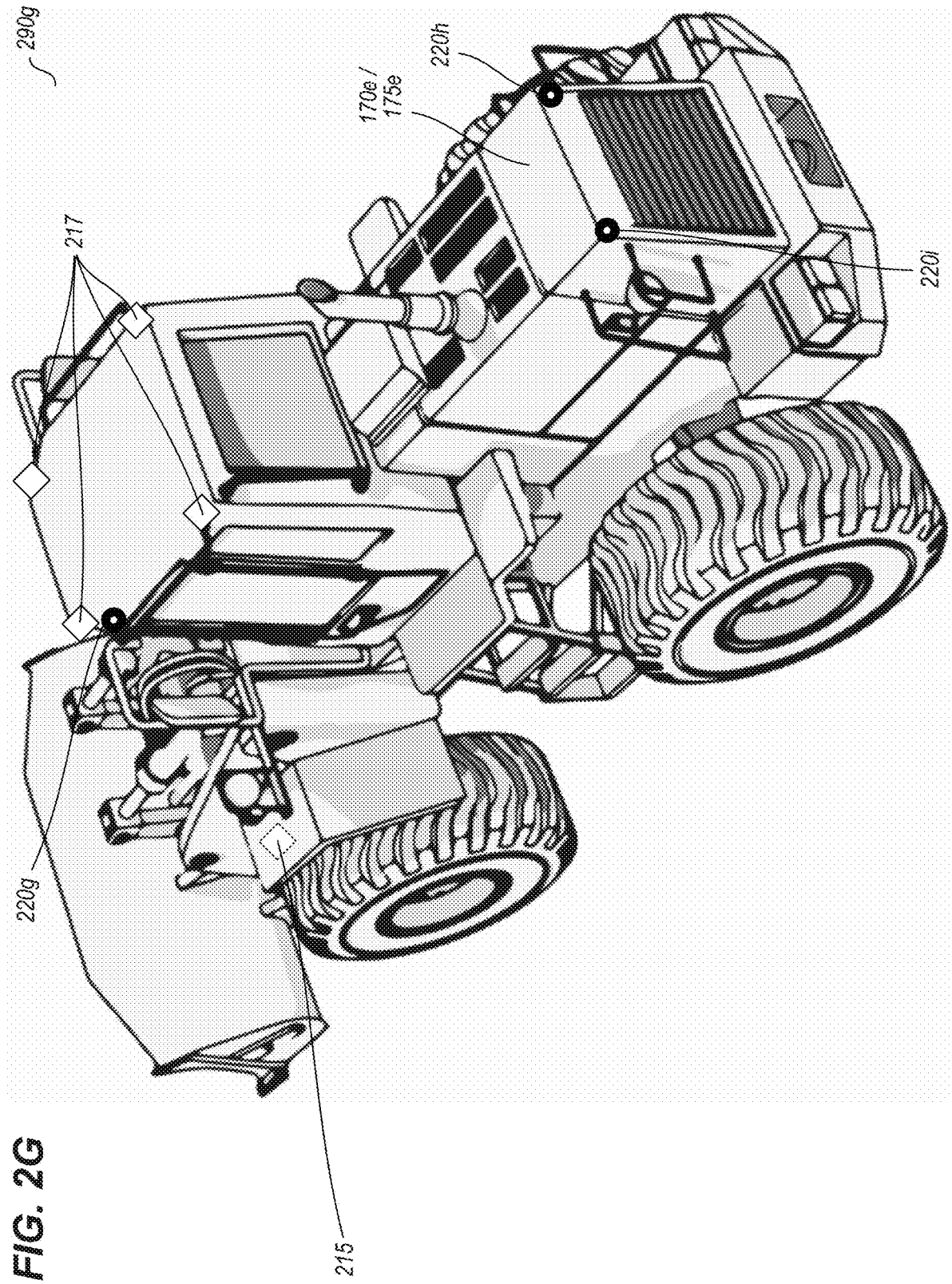

FIGS. 2F and 2G illustrate further example details about another earth-moving construction vehicle 170e and/or mining vehicle 175e, which in this example is a wheel loader vehicle, such as to illustrate example positions for GPS receivers 220 and/or inclinometers 210 and/or one or more LiDAR components 215 and cameras 217. In particular, FIG. 2F illustrates example information 290f that includes various example inclinometers 210j-210m, and example GPS antennas/receivers 220g-220i. The example inclinometers 210j-210m are further illustrated at positions that beneficially provide inclinometer data to compute the location of the bucket or other front attachment (and optionally other parts of the wheel loader, such as the hydraulic arms) relative to the cabin of the loader vehicle (e.g., at position 210j near the intersection of the boom lifting arm and the body of the vehicle, position 210k near the intersection of the boom lifting arm and the bucket or other attachment, position 210l at one end of a hydraulic arm, etc.), such as to use single-axis inclinometers in this example, and with another inclinometer 210m mounted within the cabin of the vehicle and illustrated at an approximate position using a dashed line, such as to use a dual-axis inclinometer that measures pitch and roll—data from the inclinometers may be used, for example, to track the position of the boom lifting arm and attachment relative to the cabin/body of the vehicle. The example GPS antennas/receivers 220 are further illustrated at positions that beneficially provide GPS data to assist in determining the positioning and direction of the cabin/body, including to use data from the three GPS antennas to provide greater precision than is available from a single GPS antenna. In this example, the three GPS antennas 220g-220i are positioned on the body chassis and proximate to three corners of the chassis (e.g., as far apart from each other as possible), such that differential information between GPS antennas 220g and 220i may provide cabin heading direction information, and differential information between GPS antennas 220h and 220i may provide lateral direction information at approximately 90° from that cabin heading direction information. The example one or more LiDAR components 215 are illustrated at one or more possible positions that beneficially provide LiDAR data about some or all of an environment around the vehicle 170e/175e, such as to be positioned in this example on the underside of one or more of the hydraulic arms in a manner similar to that of excavator vehicle 170a/175a (e.g., to have a view to the side(s) and/or front of the vehicle 170e/175e), and using dashed lines in FIGS. 2F and 2G due to their location being blocked by other parts of the vehicle 170e/175e. FIG. 2G also illustrates possible locations of one or more RGB cameras 217 that gather additional visual data about an environment of the vehicles 170e/175e—in this example, four cameras are used on top of the cabin (e.g., to in the aggregate provide visual coverage of some or all of 360° horizontally), with two on each side, and optionally with the two front camera facing partially or fully forwards and the two back cameras facing partially or fully backwards, although in other embodiments other camera configurations and/or types may be used (e.g., one or more cameras with panoramic view angles, such as to each cover some or all of 360° horizontally). In particular, in FIG. 2F, the example earth-moving vehicle is shown using a side-frontal view, with GPS antennas 220h and 220i illustrated on the back of the body chassis at or below the top of that portion of the body chassis (using dashed lines to illustrate their positions), and with an approximate position of GPS antenna 220g on the chassis top near the front—the positions 220g-220i are further illustrated in information 290g of FIG. 2G, which is shown using an upper-side-back view, with GPS antenna 220g shown on the body top near the front on the same side as GPS antenna 220i. While not illustrated in FIGS. 2F and 2G, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the vehicle is located) to improve accuracy of the GPS signals from the GPS antennas, so as to be part of one or more RTK-enabled GPS positioning units. It will be appreciated that other quantities, positionings and types of GPS antennas (and/or antennas for other types of satellite-based navigation systems) and/or inclinometers and/or other sensors/components may be used in other embodiments. While not illustrated in FIGS. 2A-2G, it will be appreciated that other sensors (e.g., infrared sensors, material type sensors, etc.) may be mounted on the respective powered earth moving vehicles 170 and/or 175 at various positions, such as at the same or similar positions as the LiDAR sensors and/or the image sensors of the cameras, or instead in other positions.

FIGS. 2H and 2I illustrate respective information 290 and 290i about a variety of non-exclusive example types of powered earth-moving construction vehicles 170 and powered earth-moving construction vehicles 175 that may be controlled by embodiments of the EMVAMC system. FIG. 2H includes two example earth-moving tracked construction excavator vehicles 170a shown with different attachments (excavator vehicle 170a1 with a bucket attachment, and excavator vehicle 170a2 with a grapple attachment) that may be controlled by the EMVAMC system. Other example types of earth-moving construction vehicles 170 that are illustrated in FIG. 2H include a bulldozer 170c; a backhoe loader 170d; a wheel loader 170e; a skid steer loader 170f; a dump truck 170j; a forklift 170g; a trencher 170h; a mixer truck 170i; a flatbed truck 170k; a grader 170l; a wrecking ball crane 170m; a truck crane 170n; a cherry picker 170p; a heavy hauler 170q; a scraper 170r; a pile driver 170o; a road roller 170b; etc. It will be appreciated that other types of earth-moving construction vehicles may similarly be controlled by the EMVAMC system in other embodiments. In a similar manner, FIG. 2I illustrates several example earth-moving tracked mining excavator vehicles 175a shown with different attachments (excavator vehicle 175a1 with a bucket attachment, excavator vehicle 175a3 with a dragline attachment, excavator vehicle 175a4 with a clamshell extractor attachment, excavator vehicle 175a5 with a front shovel attachment, excavator vehicle 175a6 with a bucket wheel extractor attachment, excavator vehicle 175*a*7 with a power shovel attachment, etc.) that may be controlled by the EMVAMC system. Other example types of earth-moving mining vehicles 175 that are illustrated in FIG. 2I include a dump truck 175*m*; an articulated dump truck 175*n*; a mining dump truck 175*b*; a bulldozer 175*c*; a scraper 175*d*; a tractor scraper 175*g*; a wheel loader 175*e*; a wheeled skid steer loader 175*f*; a tracked skid steer loader 175*i*; a wheeled excavator 175*h*; a backhoe loader 175*k*; a motor grader 175*j*; a trencher 175*l*; etc. It will be appreciated that other types of earth-moving mining vehicles may similarly be controlled by the EMVAMC system in other embodiments. In addition, while various types of sensors are not illustrated in FIGS. 2H-2I, it will be appreciated that such sensors (e.g., LiDAR sensors, image sensors of cameras, infrared sensors, material type sensors, etc.) may be mounted on the respective powered earth moving vehicles 170 and/or 175 at various positions, such as at the same or analogous positions as the sensors discussed with respect to FIGS. 2A-2G, or instead in other positions.

Figure 2J:
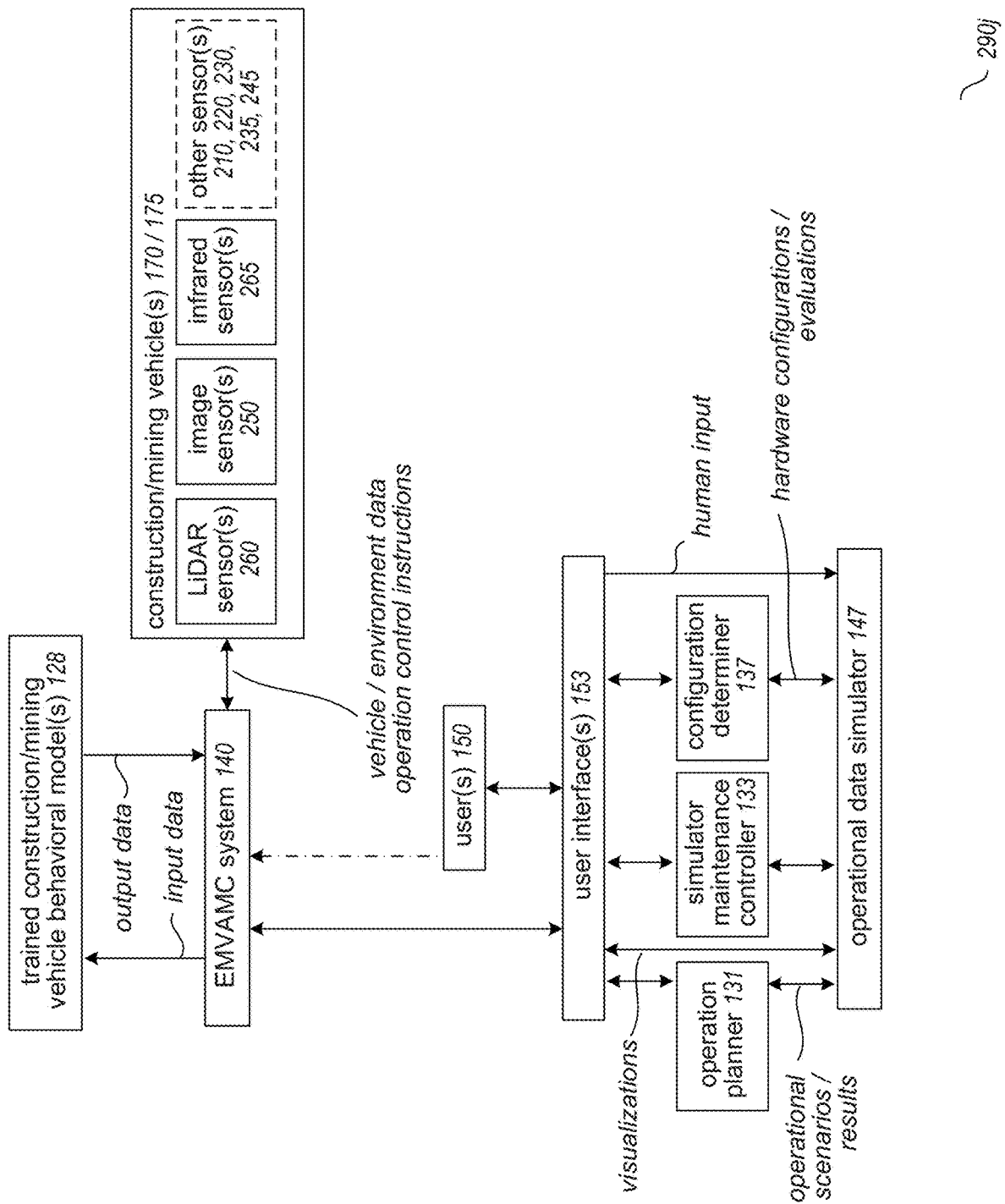
Figure 2K:
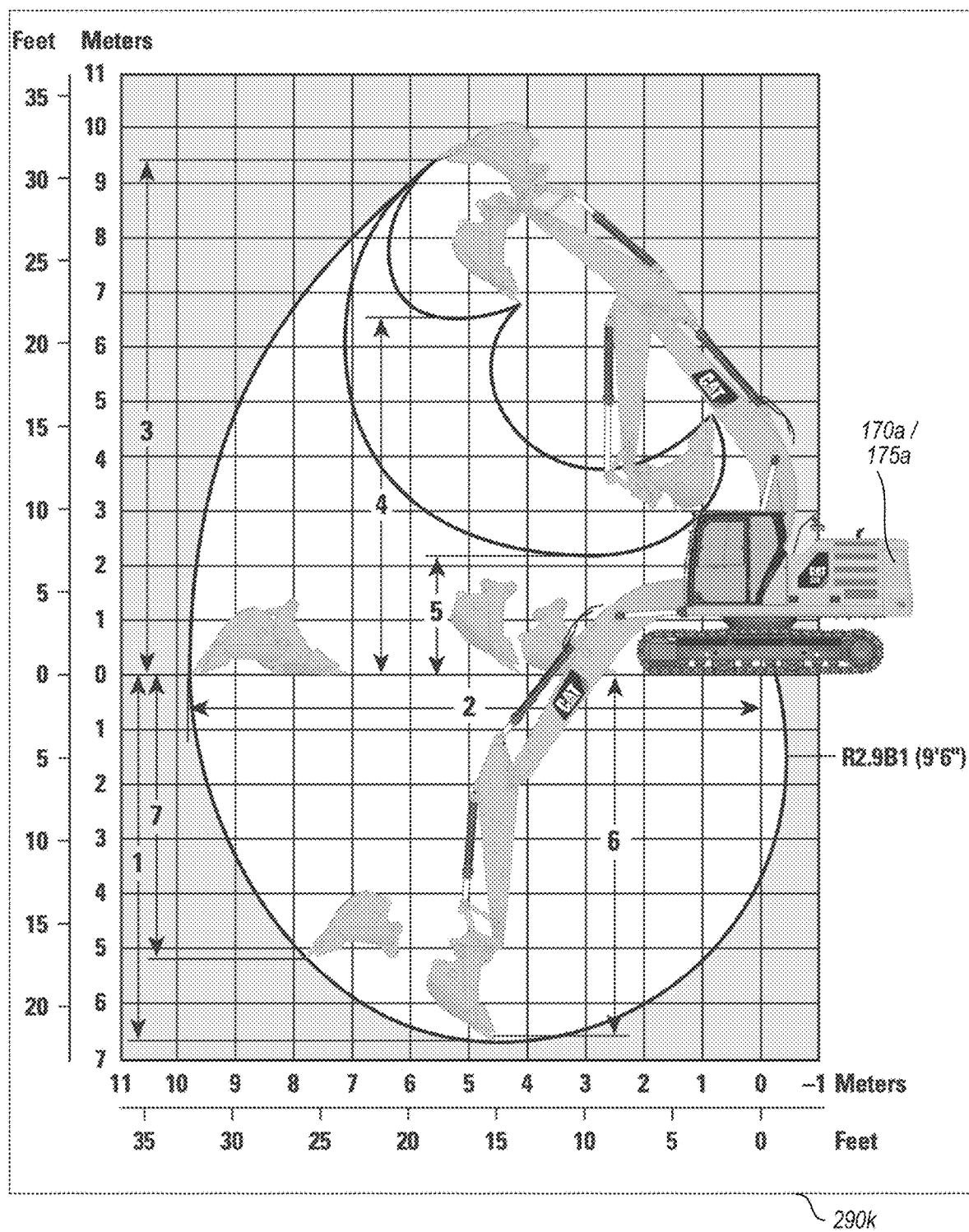

FIGS. 2J-2K illustrate examples of modules and interactions and information used to implement autonomous operations of one or more powered earth-moving vehicles based at least in part on gathered environment data. In particular, FIG. 2J illustrates information 290*j* about a powered earth-moving vehicle behavioral model 128 that is used by the EMVAMC system 140 to implement determined autonomous operations of one or more earth-moving vehicles 170/175, such as to supply input data to the behavioral model 128 corresponding to a current state and environment of the earth-moving vehicle(s) and about one or more tasks be performed (e.g., from a planner module or other source), and to receive corresponding output data that the module 140 uses to provide operation control instructions to the earth-moving vehicle(s). In this example, the earth-moving vehicle(s) 170/175 each has one or more LiDAR sensors 260 that generate data about a surrounding environment of the earth-moving vehicle(s) 170/175 (e.g., in the form of one or more 3D point clouds, not shown), one or more image sensors 250 that generate visual data about a surrounding environment of the earth-moving vehicle(s) 170/175 (e.g., video, still images, etc.), one or more infrared sensors 265 that generate infrared data about a surrounding environment of the earth-moving vehicle(s) 170/175 (e.g., for objects and other obstacles, etc.), and may optionally further have one or more other sensors 210, 220, 230, 235 or 245, and the environment data and other data obtained by the on-vehicle sensors is provided to the EMVAMC system 140. The EMVAMC system 140 may analyze the environment data and other data from the vehicle(s) 170/175 to generate additional data (e.g., to classify types of obstacles of detected objects, to generate a terrain contour map or other visual map of some or all of the surrounding environment, etc.) and to determine operation control instructions to implement on the vehicle(s) 170/175, including for movements between locations on a job site—for example, the EMVAMC system 140 may produce DIGMAP information or other 2D representations to represent the terrain of some or all of the job site, such as for use by a planner module 131; etc. As one non-exclusive example, the operation control instructions provided from the EMVAMC system 140 to a powered earth-moving vehicle may simulate inputs to the control panel on the earth-moving vehicle that would be used by a human operator, if one were present, and the behavioral model(s) 128 may translate the operation control instructions to implementation activities for the vehicle(s) 170/175 (e.g., hydraulic and/or electrical impulses) that are provided to the vehicle(s) 170/175—for example, a command may represent joystick deflection (e.g., for one or both of two joysticks, each with 2 axes), activation of a tool control button on one of the joysticks for controlling the tool attachment (e.g., claw, bucket, hammer, etc.), pedal position (e.g., for one or both of two pedals, analogous to car pedals but with a zero position in the middle and with the pedal able to move forward or backward), etc., such as using a number between −1 and 1. In one embodiment, the behavioral model achieves at least 17% efficiency improvement and 20× duty cycle improvement over human operators and proportional fuel efficiency can also be achieved. FIG. 2J further illustrates additional modules that may interact with the EMVAMC system 140 and/or each other to provide additional functionality. In particular, one or more users 150 may use one or more user interface(s) 153 (e.g., a GUI displayed on a computing device or provided via a VR and/or AR and/or mixed reality system) to perform one or more interactions, such as one or more of the following: to interact with a planner component 131 that computes an optimal plan for an entire job or to otherwise specify operational scenarios and receive simulated results, such as for use in determining optimal or otherwise preferred implementation plans to use for one or more tasks and/or multi-task jobs or to otherwise enable user what-if experimentation activities; to interact with a configuration determiner component 137 that uses the simulator module(s) 147 to determine optimal or otherwise preferred hardware component configurations to use; to interact with a simulator maintenance controller 133 to implement various types of maintenance activities; to directly supply human input for use by the simulator module(s) 147 (e.g., configuration parameters, settings, etc.); to request and receive visualizations of simulated operations and/or simulated operational data; etc. The planner component 131 may, for example, be independently developed through the design of artificial intelligence, and a plurality of plans from the planner component 131 may be input to the same trained model without having to train new models. In some embodiments, the simulator module(s) 147 may further generate rendered visualizations (e.g., visualizations such as those illustrated with respect to FIG. 2P, such as by using 'unreal engine' from Epic Games). Additional details related to one non-exclusive example embodiment of a perception module and/or system that may be included as part of the EMVAMC system 140 are included in U.S. Provisional Patent Application No. 63/401,928, filed Aug. 29, 2022 and entitled "Autonomous Control Of Operations Of Powered Earth-Moving Vehicles Using Data From On-Vehicle Perception Systems," which is hereby incorporated by reference in its entirety.

FIG. 2K illustrates information 290*k* regarding physical movement dynamics information for an example powered earth-moving vehicle 170*a*/175*a*, which in this example is an excavator vehicle, such as may be used in the training and/or implementation of behavioral models 128, and/or by the operational data simulator module 147 in simulating operations of such an earth-moving vehicle. In this example, the information 290*k* includes distances and angles that arm(s)/attachment may move, such as for a bucket/scoop attachment in this example. In at least some such embodiments, the operational data simulator module may use various movement-related equations as part of its operations, such as to include the following:

Position
  Derivative: r(t)
  integral:

$$r(t) = r_0 + \int_0^t v\,dt'$$

Velocity
  Derivative:

$$v(t) = \frac{dr}{dt}$$

Integral:

$$v(t) = v_0 + \int_0^t a\,dt'$$

Acceleration
  Derivative:

$$a(t) = \frac{dv}{dt} = \frac{d^2r}{dt^2}$$

Integral: a(t)

$$W = \int_a^b F(x)d^x$$

Then composes to the full law of motion:

$$x(t) = x_0 + \int_n^t v(\tau)d\tau =$$

$$x_0 + \int_n^t v_0 e^{-\frac{k}{m}\tau} d\tau = x_0 - \frac{mv_0}{k}\left(e^{-\frac{k}{m}t} - 1\right) = x_0 + \frac{mv_0}{k}\left(1 - e^{-\frac{k}{m}t}\right)$$

It will be appreciated that the operational data simulator module may use other equations in other embodiments, whether for earth-moving vehicles with the same or different attachments and/or for other types of earth-moving vehicles. In at least some embodiments, the operational data simulator module may, for example, simulate the effect of wet sand on the terrain. More generally, use of the operational data simulator module may perform experimentation with different alternatives (e.g., different sensors or other hardware components, component placement locations, hardware configurations, etc.) without actually placing them on physical earth-moving vehicles and/or for different environmental conditions without actually placing earth-moving vehicles in those environmental conditions, such as to evaluate the effects of the different alternatives and use that information to implement corresponding setups (e.g., to perform automated operations to determine what hardware components to install and/or where to install it, such as to determine optimal or near-optimal hardware components and/or placements; to enable user-driven operations that allow a user to plan out, define, and visualize execution of a job; etc.).

Furthermore, such data from simulated operation may be used in at least some embodiments as part of training one or more behavioral machine learning models for one or more earth-moving vehicles (e.g., for one or more types of earth-moving vehicles), such as to enable generation of corresponding trained models and methodologies (e.g., at scale, and while minimizing use of physical resources) that are used for controlling autonomous operations of such earth-moving vehicles.

Figure 2L:
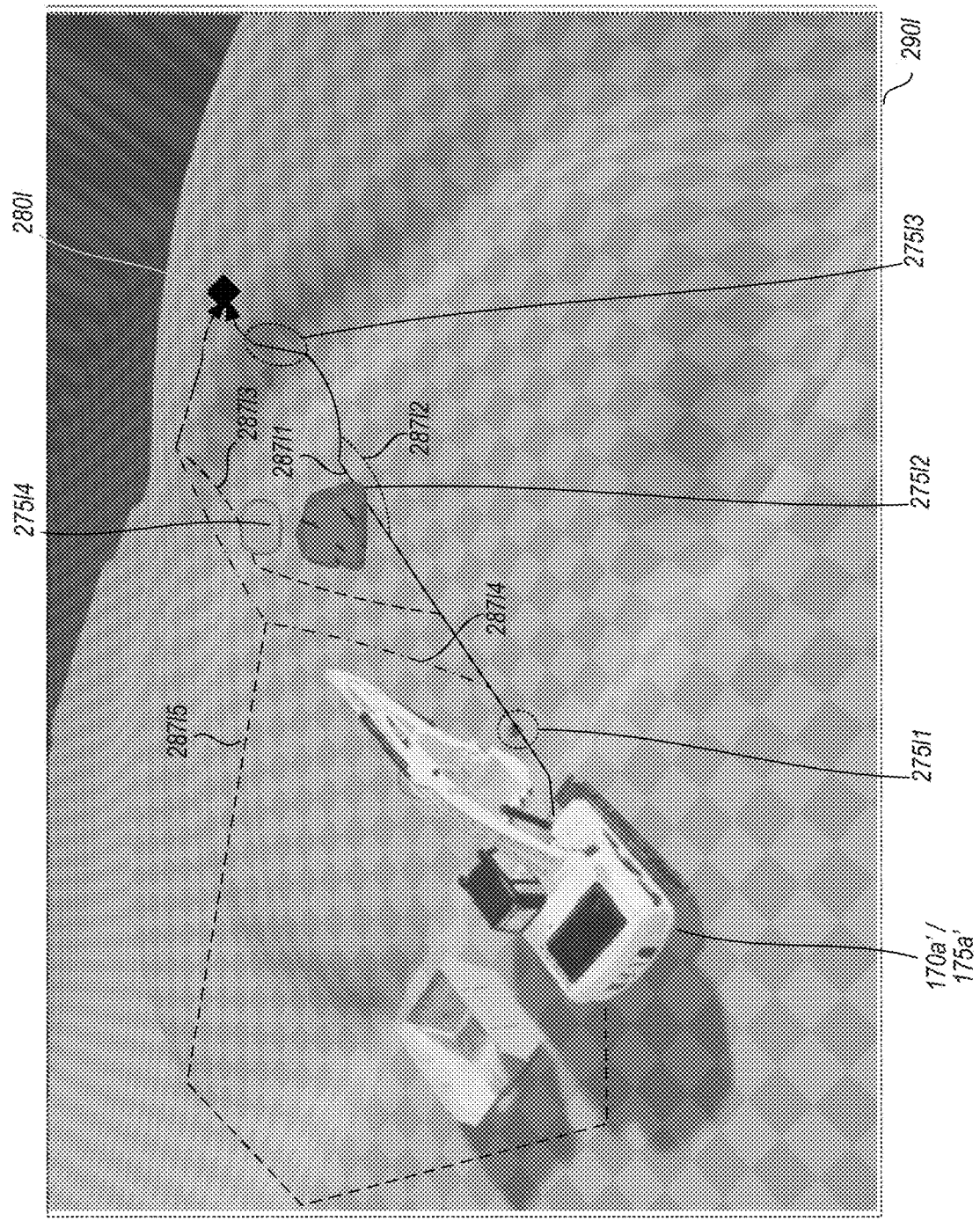
Figure 2M:
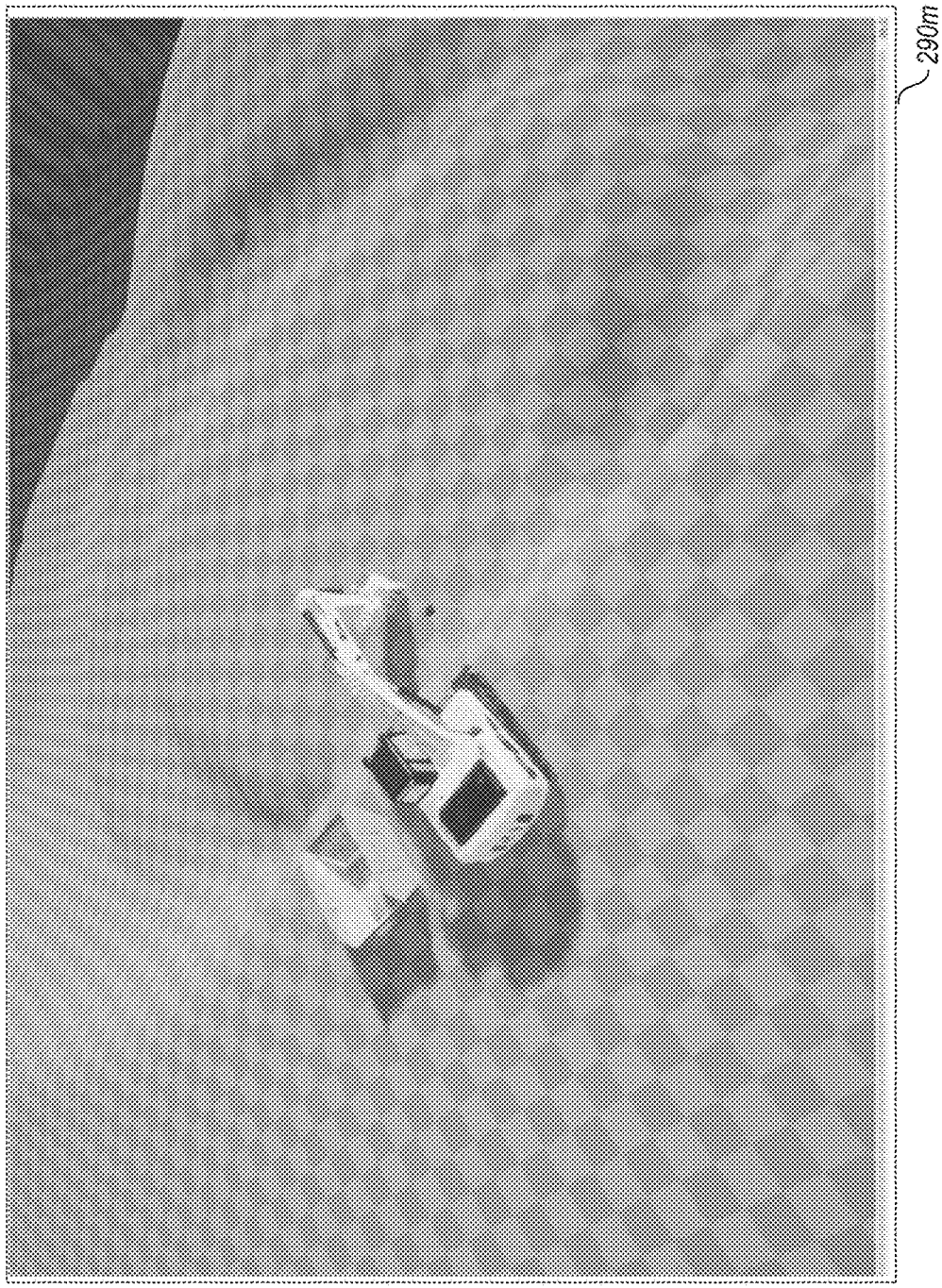
Figure 2N:
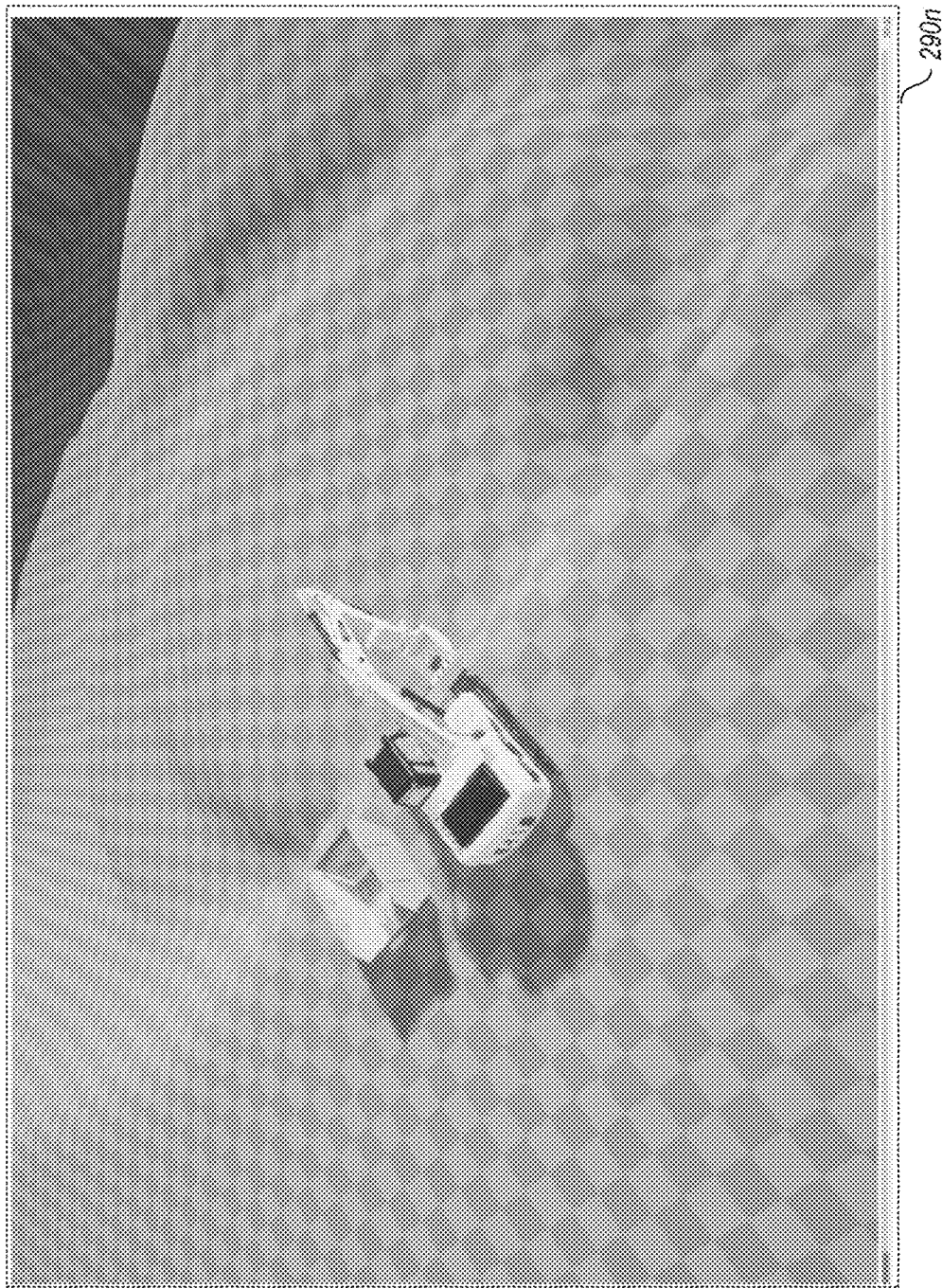
Figure 2P:
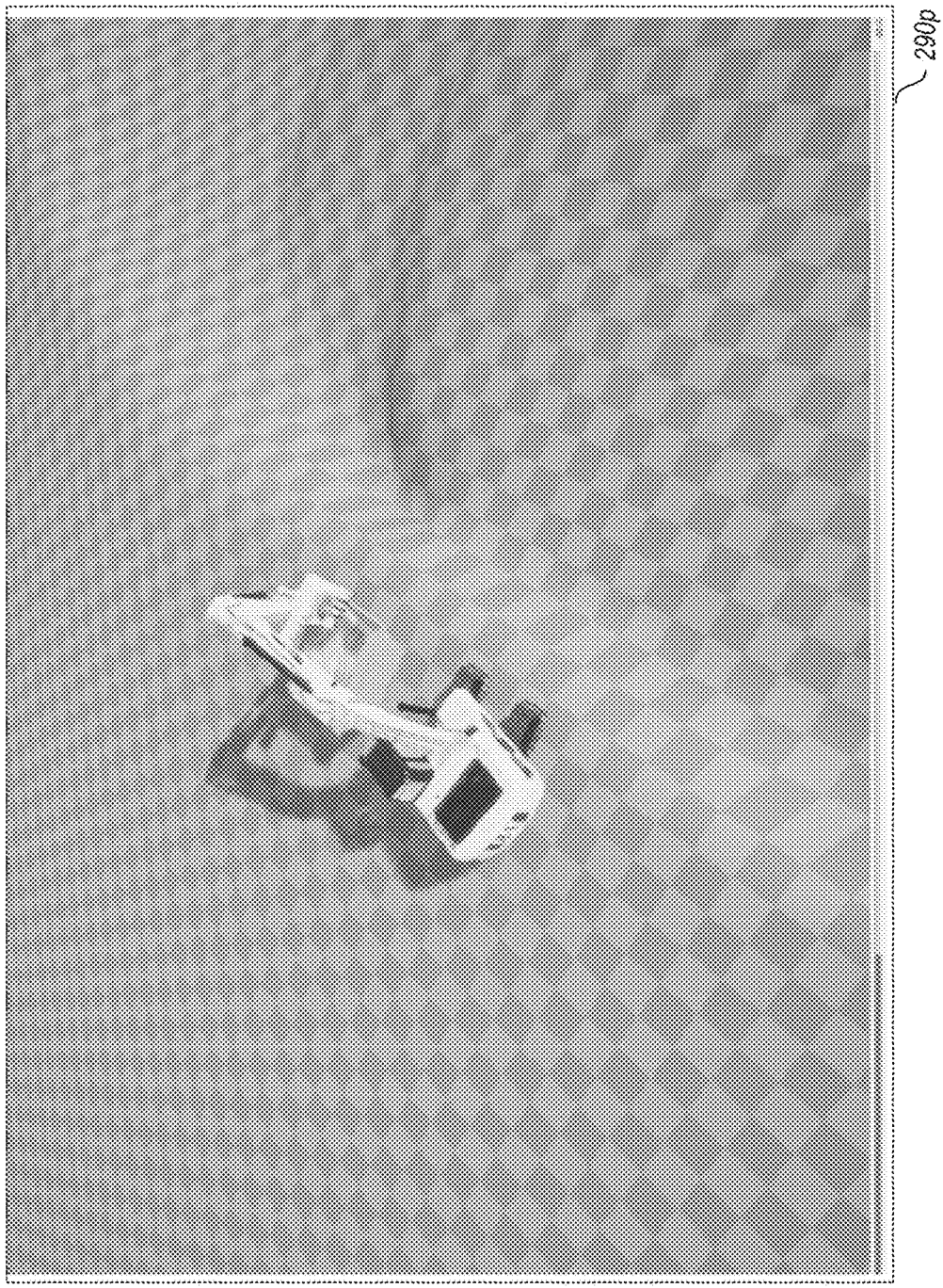
Figure 2Q:
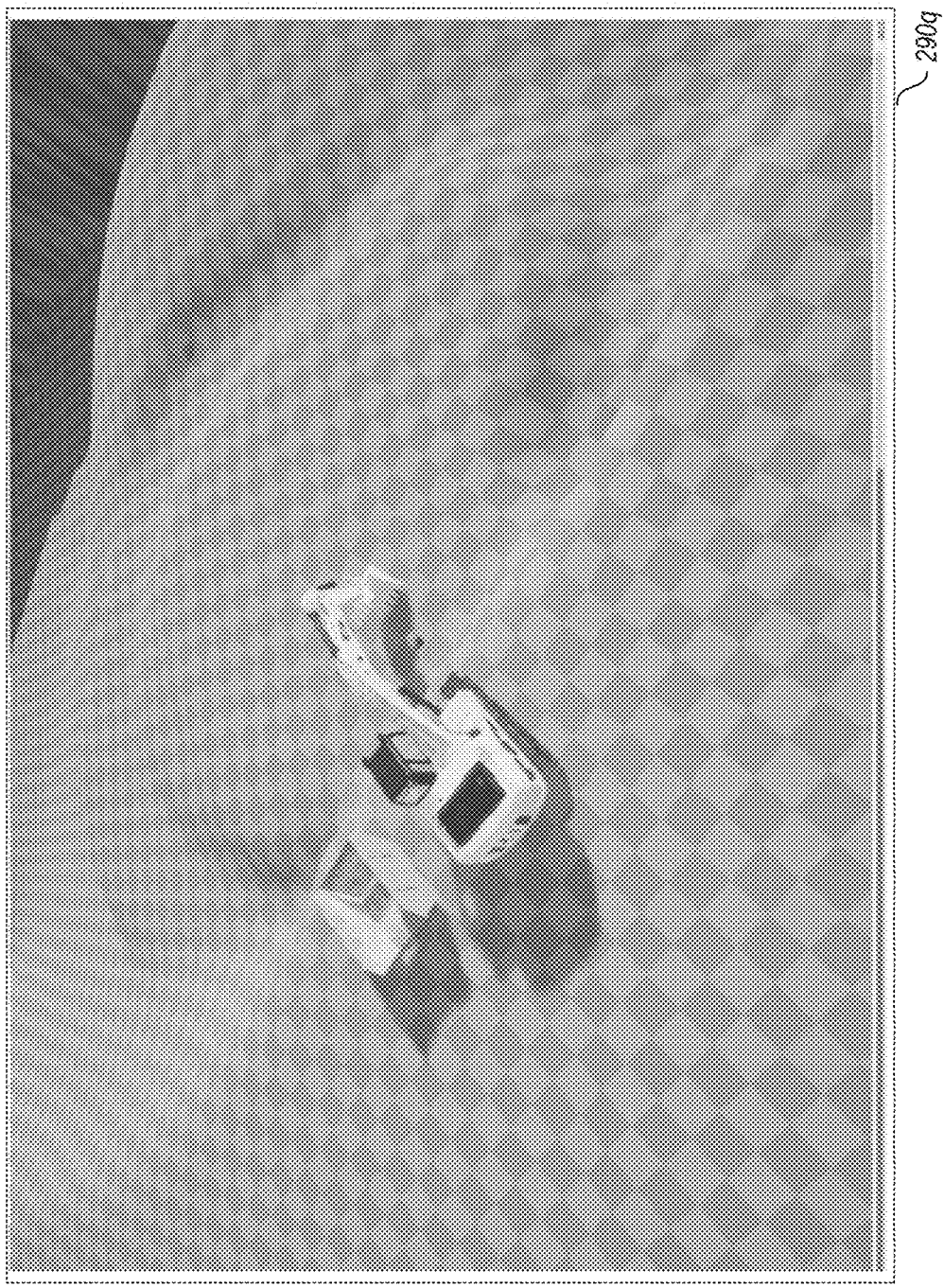
Figure 2R:
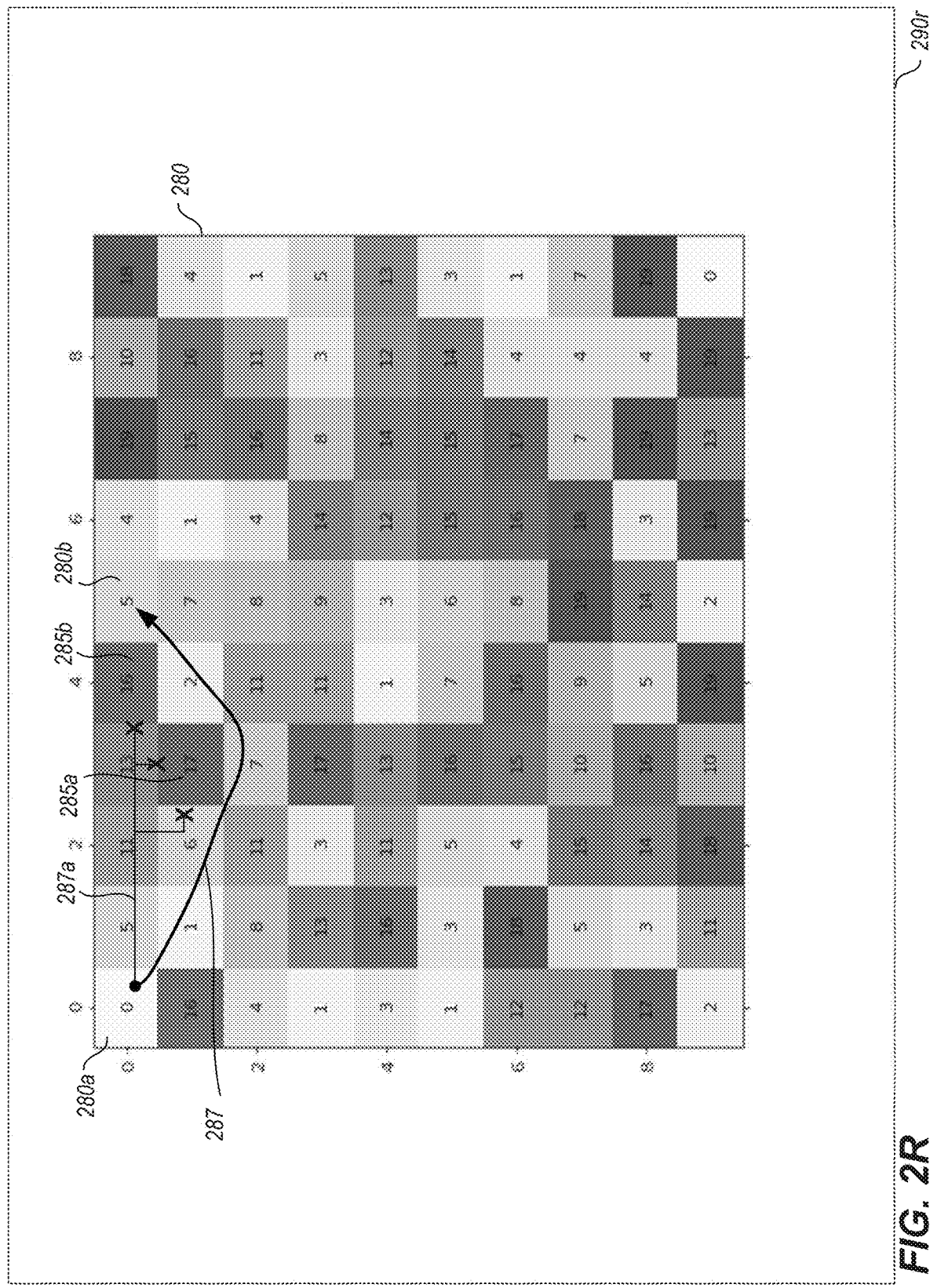
Figure 2S:
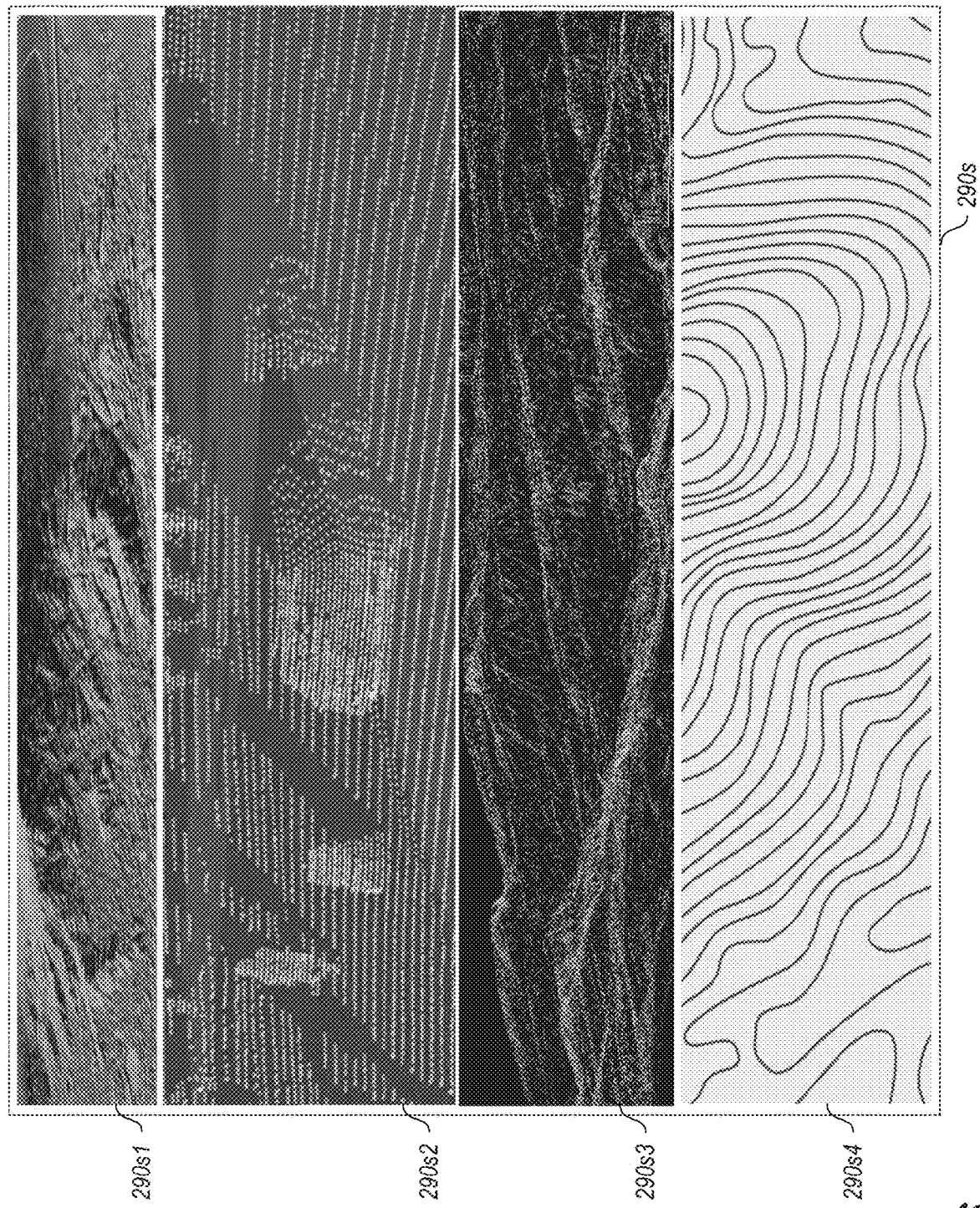

FIG. 2S illustrates further example information related to the gathering and generation of environment data, such as by perception system 140, and illustrates information 290*s* to provide non-exclusive examples of environment data that may be gathered and generated by an embodiment of the EMVAMC system 140. In this example, information 290*s*1 illustrates an example of an image of surrounding terrain that may be captured around a powered earth-moving vehicle (not shown), such as by one or more RGB cameras located on the vehicle. Information 290*s*2 illustrates an example of information that may be gathered by one or more LiDAR modules on the vehicle regarding part of a surrounding environment, such as to include 3D data points that illustrate shape and depth information for surrounding terrain, as well as objects in the environment (e.g., one or more vehicles, a person, a rock or other object, etc.). Information 290*s*3 illustrates a further example of a 3D point cloud that may be generated from LiDAR data, and shows depth and shape information for a surrounding environment, such as terrain of the environment. Information 290*s*4 illustrates one example of a visual map of a surrounding environment that may be generated from such LiDAR data, which in this example is a terrain contour visual map. In at least some embodiments, such a visual map may include a set of 3D data points, such as to each have a corresponding XYZ coordinate in relation to an origin point (e.g., a location of a LiDAR component that is used to generate the 3D data points).

FIGS. 2L-2Q illustrate examples of performing automated operations of an earth-moving vehicle on a site in response to instructions from an EMVAMC system (not shown) and of gathering various corresponding simulation data, shown using rendered visualizations in this example (e.g., as part of a simulation determined by a planning module for an actual powered earth-moving vehicle on an actual job site, before initiating autonomous operations of that actual powered earth-moving vehicle to implement a selected movement plan on that actual job site, including to potentially move and/or avoid certain obstacles and/or to take other types of actions). In particular, FIG. 2L illustrates information 290*l* showing a powered earth-moving vehicle (in this example, an excavator vehicle 170*a*' and/or 175*a*') in performing a task that involves moving from its illustrated current location to a target destination location 280*l*. In this example, various obstacles are present in an area between the current and target destination locations, and a planner module considers multiple alternative paths for the vehicle to reach the target destination location, including moving and/or avoiding obstacles—FIG. 2R includes additional details regarding possible operations of a planner module in considering multiple alternative paths for a powered earth-moving vehicle to reach a target destination location. In this example of FIG. 2L, a direct path 275*l*1 from the current location to the target destination location includes obstacles that include a small rock 275*l*1 (e.g., of moveable class 3 of 10, as discussed further below), a large obstacle 275*l*2 (e.g., a rock, boulder, or pile or other projection of material such as dirt relative to the surrounding terrain, and in this example of non-moveable but avoidable class 6 of 10, as discussed further below), and a steep slope 275/3 (e.g., of non-moveable but avoidable class 6 of 10, as discussed further below)—other obstacles in the area include a cavity 275/4 of unknown depth relative to the surrounding terrain (e.g., due to being full of water in this example, as in this example of non-moveable but avoidable class 5 of 10, as discussed further below). In light of these obstacle classifications and other terrain data, the EMVAMC system includes example alternative paths as follows: path 287/1 involving a direct path to the target destination location that would pass over or less than a minimum defined distance threshold from large obstacle 275/2 and would include traversing slope obstacle 275/3; path 287/2 that is the same as path 287/1 except for taking avoidance actions to move farther from the large obstacle 275/2; path 287/3 that avoids the large obstacle 275/2 and slope obstacle 275/3 but passes over cavity 275/4; path 287/4 that avoids the large obstacle 275/2 and slope obstacle 275/3 and cavity obstacle 275/4; and path 287/5 that avoids the same obstacles as path 287/4 and further avoids the small rock 275/1 by traveling a much longer distance; and optionally various other paths, not shown. In this example, the EMVAMC system evaluates the different alternative paths with respect to one or more cost measures (e.g., time, risk, fuel consumption, etc.), such as in a manner discussed further with respect to FIG. 2R and elsewhere herein, and selects path 287/4 to be implemented by the actual powered earth-moving vehicle on the actual job site, including to remove small rock obstacle 275/1 (e.g., by moving it to a goal location outside of the selected path, which in this example is a receptacle to the side of the powered earth-moving vehicle). In addition, while only obstacles on the ground are illustrated in this example, obstacles may be of other types in other embodiments and situations, including overhead (e.g., a power line, overhanging trees, etc.) and/or on the sides (e.g., rocks or other materials extending out from a wall or other structure), and the EMVAMC system may similarly determine movement plans in light of such other types of obstacles.

As one non-exclusive example of classifying objects, an example classification system may be used as follows: class 1, a small object that a powered earth-moving vehicle can move over without taking any avoidance action; class 2, a small object that is removeable (e.g., within the moving capabilities of a particular type of powered earth-moving vehicle and/or of any of the possible powered earth-moving vehicles, optionally within a defined amount of time and/or other defined limits such as weight and/or size and/or material type, such as to have a size that fits within a bucket attachment of the vehicle or is graspable by a grappling attachment of the vehicle, and/or to be of a weight and/or material type and/or density and/or moisture content within the operational limits of the vehicle) moving a large pile of dirt (requiring numerous scoops/pushes) and/or creating a path (e.g., digging a path through a hill, filling a ravine, etc.) and/or for which the vehicle can move over without taking any avoidance action; class 3, a small object that is removeable but for which the vehicle cannot safely move over within defined limits without taking any avoidance action; class 4, a small-to-medium object that is removeable but may not be possible to do so within defined time limits and/or other limits and for which avoidance actions are available; class 5, a medium object that is not removeable within defined time limits and/or other limits and for which avoidance actions are available; class 6, a large object that is not removeable within defined time limits and/or other limits and for which avoidance actions are available; class 7, an object that is sufficiently large and/or structurally in place to not be removeable within defined time limits and/or other limits and for which avoidance actions are not available within defined time limits and/or other limits; classes 8-10 being small animals, humans, and large animals, respectively, which cause movement of the vehicle to be inhibited (e.g., to shut the vehicle down) to prevent damage (e.g., even if within the capabilities of the vehicles to remove and/or avoid the obstacle); etc. A similar system of classifying non-object obstacles (e.g., non-level terrain surfaces) may be used, such as to correspond to possible activities of a powered earth-moving vehicle in moving and/or avoiding the obstacle (e.g., leveling a pile or other projection of material, filling a cavity, reducing the slope of an incline or decline, etc.), including in some embodiments and situations to consider factors such as steepness of non-level surfaces, traction, types of surfaces to avoid (e.g., any water, any ice, water and/or ice for a cavity having a depth above a defined depth threshold, empty ditches or ravines or other cavities above a defined cavity size threshold; etc.).

FIGS. 2M through 2P illustrate further examples of information visualizing retrieving and moving the rock obstacle 275/1 of FIG. 2L as part of implementing the selected movement plan involving path 287/4, illustrating information 290*m*-290*p*, respectively. In particular, FIG. 2M illustrates an example of moving the arm/bucket forward to a position that will allow retrieval of the rock, FIGS. 2N-2P illustrate, for example, that a 'Have Rock' state is changed to true once the rock has been successfully scooped up by the bucket of the earth-moving vehicle, and FIG. 2P further illustrates that a 'On Goal' state is changed to true once the rock is located above the receptacle (once the rock is dropped or otherwise placed into the receptacle, not shown here, the 'Success' state will further be turned to true, while the 'Have Rock' state will be returned to false). FIG. 2Q illustrates information 290*q* about an example of beginning a next episode to perform the same task (with the 'Have Rock', 'On Goal' and 'Success' states returned to false, but with Reward information being updated to indicate the successful performance of the task in the previous episode), but with the initial conditions varied (e.g., to reflect uncertainty in the available environment data about the actual obstacle, such as the actual position, shape, material type, etc.), including in this example by having the initial rock placement in FIG. 2Q being different than that of FIG. 2L, and with the initial placement of the bucket being further to the right (when facing forward from the cabin) than that of FIG. 2M. It will be appreciated that corresponding simulation activities may be performed for very large numbers of simulated episodes (e.g., hundreds, thousands, millions, etc.), and that a variety of other changes may be made to the simulation techniques in other embodiments.

FIG. 2R continues the examples of FIGS. 2A-2Q, and in this example illustrates an example of determining a path between a current location of a powered earth-moving vehicle (and a target destination location when faced with various types of obstacles. In particular, in this example, a grid 280 of sub-areas of an area of interest (e.g., a job site on which the powered earth-moving vehicle is located) are shown, with a current location 280*a* of the powered earth-moving vehicle corresponding to grid location (0,0) and a target destination location 280*b* corresponding to grid location (0,5), using (row,column) numbering. A direct path between the current and target destination locations in this example includes a path that traverses grid locations (0,0), (0,1), (0,2), (0,3), and (0,4) to arrive at grid location (0,5), and may be calculated in various manners (e.g., using the shortest distance and/or time, such as may be determined using Dijkstra's algorithm). However, the grid 280 further uses shading and numbers to reflect the actual condition of the site at the respective grid areas, with this example including obstacles of class 7 or higher (on the 10-point scale previously discussed) at locations 285a and 285b (grid locations (1,3) and (0,4), respectively)—such classifications may, for example, be based on one or more factors that may include the size of the obstacle, the type of the obstacle, the type of powered earth-moving vehicle, the distance to the obstacle (e.g., to account for accuracy of the LiDAR and/or visual data used to assess the obstacle, such as for distances greater than 200 meters; to account for turning radius or size or other attributes of the powered earth-moving vehicle; etc.). Accordingly, if such obstacles are at a classification above a defined threshold (e.g., class 7, such as corresponding to being impossible or difficult to remove, such as within defined time limits and/or other defined limits, or instead under any circumstances), one or more possible paths 287a may be considered and discarded. Instead, in this example, an alternative path 287 is determined that avoids those obstacles and is otherwise optimized with respect to one or more criteria (e.g., shortest distance, incline elevation, amount of time, fuel consumption, etc.). For example, the distance between locations 280a and 280b in this example is 200 meters, but a large unpassable rock obstacle is found 100 meters along the direct path, causing a planner component of the EMVAMC system to calculate alternative path 287 as a shortest path in light of resource calculation (e.g., using Dijkstra's algorithm). If the rock were instead smaller (e.g., below a size threshold for a moveable obstacle, such as 1×1×1 meters), a planner component of the EMVAMC system may instead determine to have the powered earth-moving vehicle perform autonomous operations that include moving towards the rock, digging it up and moving it aside, and then continuing on to the target destination location. It will be appreciated that other types of obstacles and path determinations may be used in other embodiments, such as by using a point cloud analysis routine.

The EMVAMC system may further perform additional automated operations in at least some embodiments as part of determining a movement plan for a powered earth-moving vehicle from a current location to one or more target destination locations, with non-exclusive examples including the following: having the powered earth-moving vehicle create a road (e.g., by flattening or otherwise smoothing dirt or other materials of the terrain between the locations) along a selected path as part of the movement plan, including to optionally select that path from multiple alternative paths based at least in part on a goal involving creating such a road at such a location; considering environmental conditions (e.g., terrain that is muddy or slippery due to water and/or other conditions), including in some embodiments and situations to adjust classifications of some or all obstacles in an area between the current and target destination locations to reflect those environmental conditions (e.g., temporarily, such as until the environmental conditions change); considering operating capabilities of that particular vehicle and/or of a type of that particular vehicle (e.g., attachments, size, load weight and/or material type limits or other restrictions, etc.), including in some embodiments and situations to adjust classifications of some or all obstacles in an area between the current and target destination locations to reflect those operating capabilities (e.g., temporarily, such as for planning involving that particular vehicle and/or vehicle type); using movements of some or all of the vehicle to gather additional data about the vehicle's environment (e.g., about one or more possible or actual obstacles in the environment), including in some embodiments and situations to adjust position of a moveable part of the vehicle (e.g., hydraulic arm, attachment, etc.) on which one or more sensors are mounted to enable gathering of the additional data, and/or to move location of the vehicle to enable one or more sensors that are mounted at fixed and/or moveable positions to gather the additional data; performing obstacle removal activities for an obstacle that include a series of actions by one or more powered earth-moving vehicles, such as involving moving a large pile of dirt (e.g., requiring numerous scoops, pushes or other actions), flattening or otherwise leveling some or all of a path (e.g., digging through a hill or other projection of material, filling a hole or ravine or other cavity, etc.); x; etc. In addition, EMVAMC system may perform other automated operations in at least some embodiments, with non-exclusive examples including the following: tracking movement of one or more obstacles (e.g., people, animals, vehicles, falling or sliding objects, etc.), including in response to instructions issued by the EMVAMC system for those obstacles to move themselves and/or to be moved; tracking objects on some or all of a job site as part of generating analytics information, such as using data from a single powered earth-moving vehicle on the site or by aggregating information from multiple such earth-moving vehicles, including information of a variety of types (e.g., about a number of vehicles of one or more types that are currently on the site or have passed through it during a designated period of time; about a number of people of one or more types, such as workers or visitors, that are currently on the site or have passed through it during a designated period of time; about activities of a particular vehicle and/or a particular person at a current time and/or during a designated period of time, such as vehicles and/or people that are early or late with respect to a defined time or schedule, identifying information about vehicles and/or people such as license plates or RFID transponder IDs or faces or gaits; about other types of site activities, such as material deliveries and/or pick-ups, tasks being performed, etc.); etc.

Various details have been provided with respect to FIGS. 2A-2R, but it will be appreciated that the provided details are non-exclusive examples included for illustrative purposes, and other embodiments may be performed in other manners without some or all such details. For example, multiple types of sensors may be used to provide multiple types of data and the multiple data types may be combined and used in various ways in various embodiments, including non-exclusive examples of magnetic sensors and/or IMUs (inertial measurement units) to measure position data and whether in addition to or instead of the use of GPS and inclinometer data.

Figure 3:
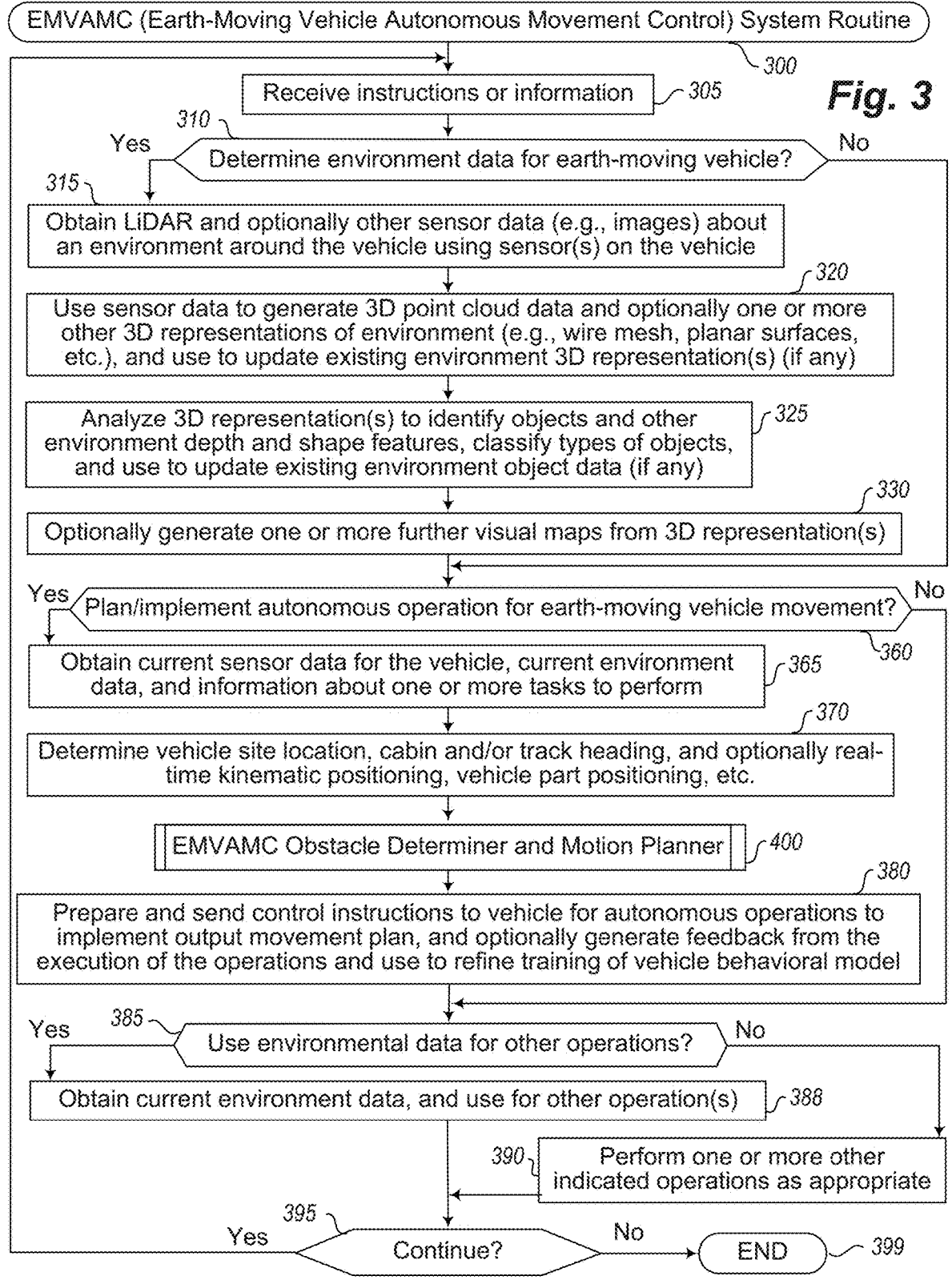
FIG. 3 is an example flow diagram of an illustrated embodiment of an Earth-Moving Vehicle Autonomous Movement Control (EMVAMC) System routine.

FIG. 3 is an example flow diagram of an illustrated embodiment of an EMVAMC (Earth-Moving Vehicle Autonomous Movement Control) System Manager routine 300. The routine may be provided by, for example, execution of an embodiment of the EMVAMC system 140 of FIGS. 1A-1B and/or the EMVAMC system discussed with respect to FIGS. 2A-2S and elsewhere herein, such as to perform automated operations for implementing autonomous control of powered earth-moving vehicles, including to automatically determine and control movement of one or more such vehicles around a site when faced with possible on-site obstacles. While routine 300 is discussed with respect to controlling operations of a single powered earth-moving vehicle at a time, it will be appreciated that the routine 300 may be performed in other manners in other embodiments, including to control operations of multiple powered earth-moving vehicles of one or more types on a job site, to be implemented by one or more configured devices or systems (optionally in multiple locations and/or operating in a distributed or otherwise coordinated manner, such as with a computing device local to a powered earth-moving vehicle performing some of the automated operations while one or more remote server systems in communication with that computing device perform additional portions of the routine), etc.

The routine 300 begins in block 305, where instructions or other information is received (e.g., waiting at block 305 until such instructions or other information is received). The routine continues to block 310 to determine whether the instructions or information received in block 305 indicate to determine environment data for an earth-moving vehicle (e.g., using LiDAR sensors and/or image sensors and optionally other sensors located on the vehicle) and if so continues to perform blocks 315-330—in at least some embodiments, sensor data may be gathered repeatedly (e.g., continuously), and if so at least block 315 may be performed for each loop of the routine and/or repeatedly while the routine is otherwise waiting (e.g., at block 305) to perform other activities. In block 315, the routine in this example embodiment obtains LiDAR data and optionally other sensor data (e.g., one or more images) for an environment around the powered earth-moving vehicle using sensors positioned on the vehicle and optionally additional other sensors on or near the vehicle (e.g., for multiple powered earth-moving vehicles on a job site to share their respective environment data, whether in a peer-to-peer manner directly between two or more such vehicles, and/or by aggregating some or all such environment data in a common storage location accessible to some or all such vehicles). In block 320, the routine then uses the sensor data to generate 3D point cloud data and optionally one or more other 3D representations of the environment (e.g., using wire mesh, planar services, voxels, etc.), and uses the generated 3D representation(s) to update other existing environment data (if any). As discussed in greater detail elsewhere herein, such sensor data may be gathered repeatedly (e.g., continuously), such as in a passive manner for whatever direction the sensor(s) on the vehicle are currently facing and/or in an active manner by directing the sensors to cover a particular area of the environment that is of interest, and environment information from different scans of the surrounding environment may be aggregated as data from new areas becomes available and/or to update previous data for an area that was previously scanned. In block 325, the routine then continues to analyze the 3D representation(s) to identify objects and other environment depth and shape features, to classify types of the objects as obstacles with respect to operations of the vehicle, and to update other existing information about such objects (if any). As discussed in greater detail elsewhere herein, such obstacle and other object data may be used in a variety of manners, including by a planner module to determine autonomous operations for the vehicle to perform.

After block 330, or if it is instead determined in block 310 that the instructions or information received in block 305 do not indicate to determine environment data for an earth-moving vehicle, the routine 300 continues to block 360 to determine whether the instructions or information received in block 305 indicate to plan and implement autonomous operations of one or more earth-moving vehicles involving moving between locations on a job site by using environment data for the vehicle (e.g., data just determined in blocks 315-330), such as based on receiving one or more tasks and/or multi-task jobs to be implemented (e.g., to identify one or more target destination locations and optionally tasks to be performed as part of movement to the target destination location(s), such as to create roads along particular paths and/or to remove particular obstacles), and if so continues to perform blocks 365-380 to perform the autonomous operations control. In block 365, the routine obtains current status information for the earth-moving vehicle(s) (e.g., sensor data for the earth-moving vehicle(s)), current environment data for the vehicle(s), and information about the one or more tasks to perform (e.g., as received in block 305). After block 365, the routine continues to block 370, where it determines information about the earth-moving vehicle (e.g., one or more of the earth-moving vehicle's location on the site, real-time kinematic positioning, cabin and/or track heading, positioning of parts of the earth-moving vehicle such as the arm(s)/bucket, particular attachments and/or other operational capabilities of the vehicle, etc.). In block 375, the routine then submits input information to an EMVAMC Obstacle Determiner And Motion Planner subroutine 400 to obtain information about one or more movement plans to be implemented in light of the vehicle's tasks and/or jobs and environment data including obstacles, and receives output from it corresponding to the movement plan operations to be performed by the earth-moving vehicle(s) to perform the one or more tasks—one example of such a subroutine 400 is discussed in greater detail with respect to FIG. 4. After block 400, the routine in block 380 prepares and sends corresponding control instructions to the earth-moving vehicle to initiate autonomous operations for performing the task(s) based on the output (and optionally to one or more other vehicles, such as to move out of a selected path, to perform some or all of removing an obstacle along a selected path, to proceed to a target destination instead of the current vehicle, etc.), and optionally generates feedback from the execution of the operations for use in subsequent refinement of the earth-moving vehicle behavioral model's training.

If it is instead determined in block 360 that the information or instructions received in block 305 are not to plan and implement automated operation of earth-moving vehicle(s), the routine continues instead to block 385 to determine if the information or instructions received in block 305 are to use environment data for other purposes (e.g., for environment data just generated in blocks 315-330), and if so the routine continues to block 388. In block 388, the routine then obtains current environment data, and uses the environment data to perform one or more additional types of automated operations. Non-exclusive examples of such additional types of automated operations include the following: tracking movement of one or more obstacles (e.g., people, animals, vehicles, falling or sliding objects, etc.), including in response to instructions issued by the EMVAMC system for those obstacles to move themselves and/or to be moved; tracking objects on some or all of a job site as part of generating analytics information, such as using data only from the earth-moving vehicle or by aggregating information from data from the earth-moving vehicle with data from one or more other earth-moving vehicles (e.g., about locations and/or activities of one or more other vehicles and/or people); etc.

If it is instead determined in block 385 that the information or instructions received in block 305 are not to use environment data for other purposes, the routine continues instead to block 390 to perform one or more other indicated operations as appropriate. For example, the operations performed with respect to block 390 may include receiving and storing data and other information for subsequent use (e.g., actual and/or simulated operational data; sensor data; an overview workplan and/or other goals to be accomplished, such as for the entire project, for a day or other period of time, and optionally including one or more tasks to be performed; etc.), receiving and storing information about earth-moving vehicles on the job site (which vehicles are present and operational, status information for the vehicles, etc.), receiving and responding to requests for information available to the EMVAMC system (e.g., for use in a displayed GUI to an operator user that is assisting in activities at the job site and/or to an end user who is monitoring activities), receiving and storing instructions or other information provided by one or more users and optionally initiating corresponding activities, etc. While not illustrated here, in some embodiments the routine may perform further interactions with a client or other end user, such as before, during or after receiving or providing information in block 390, as discussed in greater detail elsewhere herein. In addition, it will be appreciated that the routine may perform operations in a synchronous and/or asynchronous manner.

After blocks 388 or 390, the routine continues to block 395 to determine whether to continue, such as until an explicit indication to terminate is received, or instead only if an explicit indication to continue is received. If it is determined to continue, the routine returns to block 305 to wait for additional information and/or instructions, and otherwise continues to block 399 and ends.

FIG. 4 is an example flow diagram of an illustrated embodiment of an EMVAMC (Earth-Moving Vehicle Autonomous Movement Control) Obstacle Determiner and Motion Planner routine 400. The routine may be provided by, for example, execution of an embodiment of components 147 and/or 148 of the EMVAMC system 140 of FIGS. 1A-1B and/or the EMVAMC system discussed with respect to FIGS. 2A-2R and elsewhere herein, such as to perform automated operations for analyzing information about potential obstacles in an environment of a powered earth-moving vehicle and determining corresponding information (e.g., a classification of the type of the obstacle), and determining how to accomplish a goal that includes moving a powered earth-moving vehicle from its current location to a determined target destination location (e.g., determining how to handle any possible obstacles between the current and destination locations). The routine 400 may be invoked in various manners, including by the EMVAMC System Manager routine 300 as discussed in FIG. 3, and if so may return to that invocation location after a pass through the routine. While routine 400 is discussed with respect to controlling operations of a single powered earth-moving vehicle at a time, it will be appreciated that the routine 400 may be performed in other manners in other embodiments, including to control operations of multiple powered earth-moving vehicles and/or other types of powered earth-moving vehicles on a job site, to be implemented by one or more configured devices or systems (optionally in multiple locations and/or operating in a distributed or otherwise coordinated manner, such as with a computing device local to a powered earth-moving vehicle performing some of the automated operations while one or more remote server systems in communication with that computing device perform additional portions of the routine), to separate the operations related to object determination and classification from those related to movement planning (e.g., to be executed at different times), etc.

The routine 400 begins in block where it obtains information (e.g., as supplied from routine 300) about a powered earth-moving vehicle's target destination location (and optionally associated tasks) and current vehicle information (e.g., location, operating capabilities, other current status, etc.), and about current environment data for surroundings of the vehicle. The routine continues to block 415 to determine whether to classify obstacles identified in the environment data (e.g., if obstacle classification is not already available, such as from previous classification activities after which the environment data has not changed), and if not proceeds to block 425 to retrieve existing obstacle classification data, and otherwise continues to block 420 to perform obstacle classification activities. The activities may include identifying any objects or other obstacles in some or all of the environment data (e.g., an area between the current vehicle location and target destination location, such as along a direct path and a defined amount of additional area to the sides of the direct path), such as for surfaces that differ from level terrain by at least a defined amount and/or that satisfy other defined criteria (e.g., have sizes above a defined threshold amount, have associated temperatures that differ from ambient terrain temperature by at least a defined amount, have pixel reflectance values or other visual characteristics that differ from those of ambient terrain temperature by at least a defined amount, etc.). For any such identified obstacles, the routine may further determine if the obstacle is already known, and if so, track any movement and/or other changes and update corresponding object information accordingly, and to optionally treat the obstacle as a new one if the changes exceed one or more criteria. If an identified obstacle is determined to be new (or to be treated as new), the routine may further analyze information about the object to classify it (e.g., information about size, shape, distance from the vehicle, material type, surface conditions, etc.), and such as to classify whether the object can be ignored, cannot be ignored but can be removed, cannot be removed but can be avoided, and cannot be removed or avoided, such as to cause inhibition of vehicle movement if all alternative paths to the target destination location have at least one obstacle that cannot be removed or avoided. An object may be characterized as being unable to be removed or avoided if it is determined to be a human or animal (e.g., based on heat signature and/or movement) or if it is determined to be a structural element (e.g., a building or building portion, a vehicle, etc.). An object may be characterized as being able to be ignored if it satisfies one or more defined criteria (e.g., an object below a defined size, terrain that is within a defined amount of being level, based on the material type, etc.). An object may be characterized as being removable if it cannot be ignored but is within the vehicle's operating capabilities to move it (e.g., to fit within the vehicle's attachment), and avoidable if it is not removable but the vehicle is able to move around the obstacle without exceeding any safety criteria.

After blocks 420 or 425, the routine continues to block 435 to determine if all possible paths to the target destination location include at least one obstacle that is classified as inhibiting vehicle movement, and if so continues to block 440 to determine to initiate inhibiting vehicle movements (e.g., until conditions change), and to optionally identify one or more other powered earth-moving vehicles (e.g., of the same vehicle type) on the job site and to initiate movement of one of those identified vehicles to the target destination location (e.g., to provide corresponding instructions to the identified vehicle(s), to provide one or more corresponding tasks to the planner module, etc.). Otherwise, the routine continues to block 450 to evaluate one or more alternative paths to the target destination location and to select one of the paths to implement based on the evaluation—the evaluation may, for example, include scoring each of the alternative paths with respect to one or more evaluation criteria, such as total distance, time, etc.) when considering actions associated with any obstacles along a path (e.g., time to remove, distance to avoid, etc.). In some embodiments, the selection process may proceed as follows: first select a direct path if it has at most obstacles that can be ignored; to otherwise next consider selecting an alternative path that avoids any obstacles that cannot be ignored (e.g., the highest scoring such alternative path) if one exists; to otherwise next consider removing moveable obstacles along the direct path (if all its obstacles are moveable); to otherwise next consider selecting an alternative path that includes removing moveable obstacles and avoiding any obstacles that cannot be ignored; and to otherwise proceed in the manner discussed with respect to block 440—in at least some such embodiments, to implement choices other than moving along the direct path with at most obstacles that can be ignored, the routine may perform one or more additional activities to determine how to proceed, such as to use heuristics, to use specialized reinforcement learning models that are trained to handle specific types of situations, to use a simulation module to evaluate various possible alternatives under varying conditions (e.g., corresponding to uncertainty in the environment data and/or vehicle data), to perform NB or other multi-alternative testing across multiple decisions made for one or more powered earth-moving vehicles, etc. In block 460, the routine then determines a movement plan for the vehicle that implements the selected path (if any) and any associated obstacle removal activities, and that optionally performs one or more additional tasks along the selected path if appropriate.

After blocks 440 or 460, the routine continues to block 499 and returns, such as to return to continuing execution of routine 300 if the current execution of the routine 400 was invoked from that routine 300.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method, comprising:
    obtaining, from a plurality of sensors mounted on a powered earth-moving vehicle on a job site, vehicle data about the powered earth-moving vehicle, including a track heading direction of one or more tracks of the powered earth-moving vehicle using at least one track sensor, and GPS coordinates for one or more portions of a chassis of the powered earth-moving vehicle using one or more GPS antenna sensors;
    obtaining, from a plurality of additional sensors, environment data about an area of the job site, including at least one of LiDAR data about the area from one or more LiDAR sensors, or visual data about the area from one or more image sensors, and further including infrared data for the area from one or more infrared sensors mounted on the powered earth-moving vehicle;
    classifying, by one or more configured hardware processors and based at least in part on the environment data, an obstacle located on a path between a current position of the powered earth-moving vehicle on the job site and a target destination location on the job site, wherein the classifying of the obstacle is based in part on the infrared data and includes using one or more trained machine learning models to determine whether the obstacle is at least one of a person or an animal;
    monitoring, by the one or more configured hardware processors, and after the classifying and using one or more of the additional sensors, the obstacle to detect whether the obstacle is moving;
    determining, by the one or more configured hardware processors, and based at least in part on the classifying and on the monitoring of the obstacle to detect whether the obstacle is moving, information about the obstacle that includes the obstacle is the at least one of the person or the animal based at least in part on the infrared data for the obstacle being above a defined temperature threshold;
    determining, by the one or more configured hardware processors and based at least in part on a combination of the vehicle data and the environment data, to perform autonomous operations of the powered earth-moving vehicle that include inhibiting movement of the powered earth-moving vehicle until the obstacle is no longer located on the path in response to the obstacle being determined to be the at least one of the person or the animal; and
    initiating, by the one or more configured hardware processors, the determined autonomous operations of the powered earth-moving vehicle.

2. The computer-implemented method of claim 1 wherein at least one of the one or more hardware processors is a low-voltage microcontroller that is located on the powered earth-moving vehicle and is configured to implement automated operations of an earth-moving vehicle autonomous movement control system by executing software instructions of the earth-moving vehicle autonomous movement control system, and wherein the classifying and the monitoring and the determining of the information about the obstacle and the determining to perform autonomous operations and the initiating are performed autonomously without receiving human input and without receiving external signals other than GPS signals and real-time kinematic (RTK) correction signals.

3. The computer-implemented method of claim 1 wherein the plurality of sensors further include one or more inclinometer sensors mounted on at least one moveable part of the powered earth-moving vehicle to provide inclinometer data in at least one dimension for the at least one moveable part, wherein the at least one moveable part of the powered earth-moving includes one or more of a hydraulic arm or the attachment of the powered earth-moving vehicle, and wherein the method further comprises: computing, by the one or more configured hardware processors, a position of the at least one moveable part based at least in part on the inclinometer data; and before movements of the powered earth-moving vehicle toward the target destination location, rotating, if a cabin heading direction of a cabin of the powered earth moving vehicle is different from the track heading direction, the cabin until an updated cabin heading direction matches the track heading, and adjusting the position of the at least one moveable part to a determined new position.

4. The computer-implemented method of claim 1 wherein the additional sensors include the one or more LiDAR sensors and the one or more image sensors and at least one of the additional sensors is mounted on at least one moveable part of the powered earth-moving vehicle, wherein the at least one moveable part of the powered earth-moving vehicle includes one or more of a hydraulic arm or the attachment of the powered earth-moving vehicle, and wherein the method further comprises:
  determining, by the one or more configured hardware processors, to adjust a position of the at least one moveable part to a determined new position to enable collection of additional environment data from the at least one additional sensor mounted on at least one moveable part; and
  using, by the one or more configured hardware processors, the additional environment data as part of performing at least one of the classifying or the determining to perform the autonomous operations.

5. The computer-implemented method of claim 1 further comprising one or more material analysis sensors to obtain material data about a material of the obstacle, and wherein the classifying of the obstacle is further based on the material data.

6. The computer-implemented method of claim 1 wherein the job site is at least one of a construction site or a mining site, wherein the powered earth-moving vehicle is at least one of an excavator vehicle or a bulldozer vehicle or a loader vehicle or a dump truck vehicle, and wherein the obstacle is at least one of a rock or a projection of material or a cavity that is absent material.

7. The computer-implemented method of claim 1 wherein the determining of the autonomous operations includes, by a planner module of an earth-moving vehicle autonomous movement control system, considering multiple alternative paths between the current position and the target destination location, selecting the path from the multiple alternative paths, and providing instructions to another powered earth-moving vehicle on the job site to initiate additional autonomous operations to move out of the selected path.

8. A system, comprising:
  a plurality of sensors mounted on a powered earth-moving vehicle on a job site, including at least one track sensor, and one or more GPS antenna sensors;
  a plurality of additional sensors mounted on the powered earth-moving vehicle, including one or more LiDAR sensors, one or more image sensors, and one or more infrared sensors; and
  a self-contained control unit on the powered earth-moving vehicle that includes one or more hardware processors configured to, when executing stored instructions, perform automated operations including:
    obtaining, from the plurality of sensors mounted on the powered earth-moving vehicle, vehicle data about the powered earth-moving vehicle, including a track heading direction of one or more tracks of the powered earth-moving vehicle using the at least one track sensor, and GPS coordinates for one or more portions of a chassis of the powered earth-moving vehicle using the one or more GPS antenna sensors;
    obtaining, from the plurality of additional sensors, environment data about an area of the job site, including LiDAR data about the area from the one or more LiDAR sensors, and visual data about the area from the one or more image sensors, and infrared data for the area from the one or more infrared sensors;
    classifying, based at least in part on the environment data, an obstacle located on a path between a current position of the powered earth-moving vehicle on the job site and a target destination location on the job site, wherein the classifying of the obstacle is based in part on the infrared data and includes using one or more trained machine learning models to determine whether the obstacle is at least one of a person or an animal;
    monitoring, after the classifying and using one or more of the additional sensors, the obstacle to detect whether the obstacle is moving;
    determining, based at least in part on the classifying and on the monitoring of the obstacle to detect whether the obstacle is moving and on the infrared data for the obstacle being above a defined temperature threshold, information about the obstacle that includes the obstacle is the at least one of the person or the animal, or that includes the obstacle is movable out of the path by an attachment of the powered earth-moving vehicle;
    determining, based at least in part on a combination of the vehicle data and the environment data, to perform autonomous operations of the powered earth-moving vehicle that include inhibiting movement of the powered earth-moving vehicle if the obstacle is determined to be the at least one of the person or the animal, and otherwise that include movement of the powered earth-moving vehicle from the current position to the target destination location, including rotating, if a cabin heading direction of a cabin for the powered earth-moving vehicle is different from the track heading direction, the cabin until an updated cabin heading direction matches the track heading direction, and further including removing the obstacle from the path and moving along the path to the target destination location; and initiating the determined autonomous operations of the powered earth-moving vehicle, including continuing the inhibiting until the obstacle is no longer located on the path.

9. The system of claim 8 wherein at least one of the one or more hardware processors is a low-voltage microcontroller that is located on the powered earth-moving vehicle and is configured to implement automated operations of an earth-moving vehicle autonomous movement control system by executing software instructions of the earth-moving vehicle autonomous movement control system, and wherein the classifying and the monitoring and the determining of the information about the obstacle and the determining to perform autonomous operations and the initiating are performed autonomously without receiving human input and without receiving external signals other than GPS signals and real-time kinematic (RTK) correction signals.

10. The system of claim 8 wherein the plurality of sensors further include one or more inclinometer sensors mounted on at least one moveable part of the powered earth-moving vehicle to provide inclinometer data in at least one dimension for the at least one moveable part, wherein the at least one moveable part of the powered earth-moving includes one or more of a hydraulic arm or the attachment of the powered earth-moving vehicle, and wherein the automated operations further include:

computing a position of the at least one moveable part based at least in part on the inclinometer data; and before movements of the powered earth-moving vehicle toward the target destination location, rotating the cabin until an updated cabin heading direction matches the track heading direction, and adjusting the position of the at least one moveable part to a determined new position.

11. The system of claim 8 wherein at least one of the one or more LiDAR sensors or the one or more image sensors is mounted on at least one moveable part of the powered earth-moving vehicle, wherein the at least one moveable part of the powered earth-moving vehicle includes one or more of a hydraulic arm or the attachment of the powered earth-moving vehicle, and wherein the automated operations further include:

determining to adjust the position of the at least one moveable part to a determined new position to collect additional environment data from the at least one of the one or more LiDAR sensors or the one or more image sensors mounted on the at least one moveable part of the powered earth-moving vehicle; and using the additional environment data as part of performing at least one of the classifying or the determining to perform the autonomous operations.

12. The system of claim 8 further comprising one or more material analysis sensors to obtain material data about material of the obstacle, and wherein the classifying of the obstacle is further based on the material data.

13. The system of claim 8 further comprising the powered earth-moving vehicle.

14. The system of claim 13 wherein the job site is at least one of a construction site or a mining site, wherein the powered earth-moving vehicle is at least one of an excavator vehicle or a bulldozer vehicle or a loader vehicle or a dump truck vehicle, and wherein the obstacle is at least one of a rock or a projection of material or a cavity that is absent material.

15. The system of claim 8 wherein the determining of the autonomous operations includes, by a planner module of an earth-moving vehicle autonomous movement control system, considering multiple alternative paths between the current position and the target destination location, selecting the path from the multiple alternative paths, and providing instructions to another powered earth-moving vehicle on the job site to initiate additional autonomous operations to move out of the selected path.

16. A non-transitory computer-readable medium having stored contents that cause one or more hardware processors to perform automated operations including at least:

obtaining, by the one or more hardware processors and from a plurality of sensors mounted on a powered earth-moving vehicle on a job site, vehicle data about the powered earth-moving vehicle, including a track heading direction of one or more tracks of the powered earth-moving vehicle using at least one track sensor, and GPS coordinates for one or more portions of a chassis of the powered earth-moving vehicle using one or more GPS antenna sensors;

obtaining, by the one or more hardware processors and from a plurality of additional sensors mounted on the powered earth-moving vehicle, environment data about an area of the job site, including LiDAR data about the area from one or more LiDAR sensors, and visual data about the area from one or more image sensors, and infrared data for the area from one or more infrared sensors mounted on the powered earth-moving vehicle;

classifying, by the one or more hardware processors and based at least in part on the environment data, an obstacle located on a path between a current position of the powered earth-moving vehicle on the job site and a target destination location on the job site, wherein the classifying of the obstacle is based in part on the infrared data and includes using one or more trained machine learning models to determine whether the obstacle is at least one of a person or an animal;

monitoring, by the one or more hardware processors and after the classifying and using one or more of the additional sensors, the obstacle to detect whether the obstacle is moving;

determining, by the one or more hardware processors, and based at least in part on the classifying and on the monitoring of the obstacle to detect whether the obstacle is moving and on the infrared data for the obstacle being above a defined temperature threshold, information about the obstacle that includes the obstacle is the at least one of the person or the animal, or that includes the obstacle is movable out of the path by an attachment of the powered earth-moving vehicle;

determining, by the one or more hardware processors and based at least in part on a combination of the vehicle data and the environment data, to perform autonomous operations of the powered earth-moving vehicle that include inhibiting movement of the powered earth-moving vehicle if the obstacle is determined to be the at least one of the person or the animal, and otherwise that include movement of the powered earth-moving vehicle from the current position to the target destination location, including rotating, if a cabin heading direction for a cabin of the powered earth-moving vehicle is different from the track heading direction, the cabin until an updated cabin heading direction matches the track heading direction, and further including removing the obstacle from the path and moving along the path to the target destination location; and initiating, by the one or more hardware processors, the determined autonomous operations of the powered earth-moving vehicle, including continuing the inhibiting until the obstacle is no longer located on the path.

17. The non-transitory computer-readable medium of claim 16 wherein at least one of the one or more hardware processors is a low-voltage microcontroller that is located on the powered earth-moving vehicle and is configured to implement automated operations of an earth-moving vehicle autonomous movement control system by executing software instructions of the earth-moving vehicle autonomous movement control system, and wherein the classifying and the monitoring and the determining of the information about the obstacle and the determining to perform autonomous operations and the initiating are performed autonomously without receiving human input and without receiving external signals other than GPS signals and real-time kinematic (RTK) correction signals.

18. The non-transitory computer-readable medium of claim 16 wherein the plurality of sensors further include one or more inclinometer sensors mounted on at least one moveable part of the powered earth-moving vehicle to provide inclinometer data in at least one dimension for the at least one moveable part, wherein at least one of the one or more LiDAR sensors or the one or more image sensors is mounted on at least one moveable part of the powered earth-moving vehicle, wherein the at least one moveable part of the powered earth-moving includes one or more of a hydraulic arm or the attachment of the powered earth-moving vehicle, and wherein the automated operations further include:

computing a position of the at least one moveable part based at least in part on the inclinometer data;

determining to adjust the position of the at least one moveable part to a determined new position to collect additional environment data from the at least one of the one or more LiDAR sensors or the one or more image sensors mounted on the at least one moveable part of the powered earth-moving vehicle; and using the additional environment data as part of performing at least one of the classifying or the determining to perform the autonomous operations.

\* \* \* \* \*

UNITED STATES PATENT AND TRADEMARK OFFICE
CERTIFICATE OF CORRECTION

PATENT NO. : 11,952,746 B1
APPLICATION NO. : 17/970427
DATED : April 9, 2024
INVENTOR(S) : Robert Kotlaba et al.

It is certified that error appears in the above-identified patent and that said Letters Patent is hereby corrected as shown below:

In the Claims

Column 33, Line 29, Claim 3:
"direction matches the track heading, and adjusting the posi-" should read --direction matches the track heading direction, and adjusting the posi- --.

Signed and Sealed this
Fourteenth Day of May, 2024

Katherine Kelly Vidal
*Director of the United States Patent and Trademark Office*